April 15, 1952     M. CARUSO     2,593,102
VENDING MACHINE
Filed Dec. 26, 1946     18 Sheets-Sheet 1
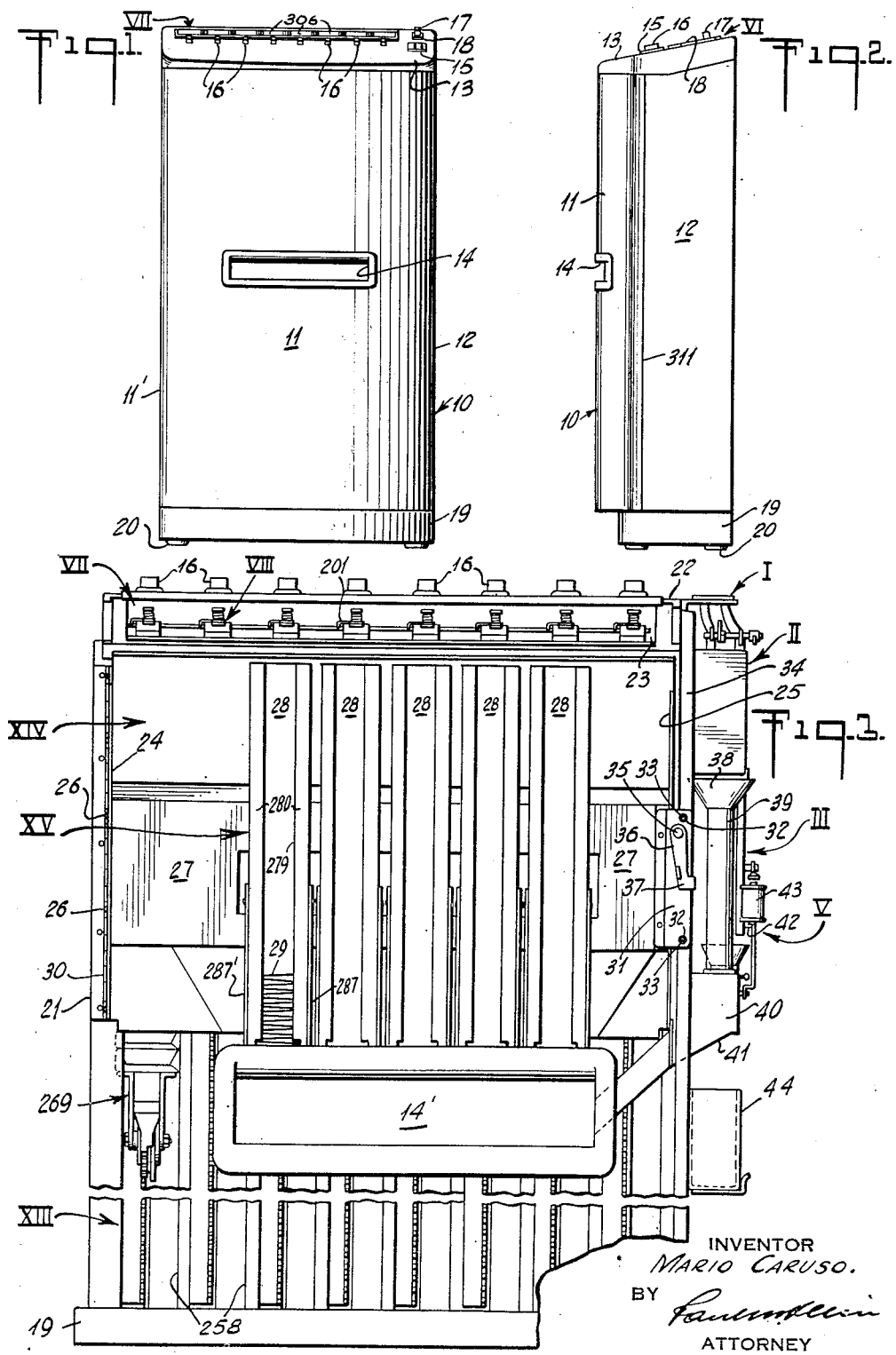

April 15, 1952 M. CARUSO 2,593,102
VENDING MACHINE
Filed Dec. 26, 1946 18 Sheets-Sheet 3
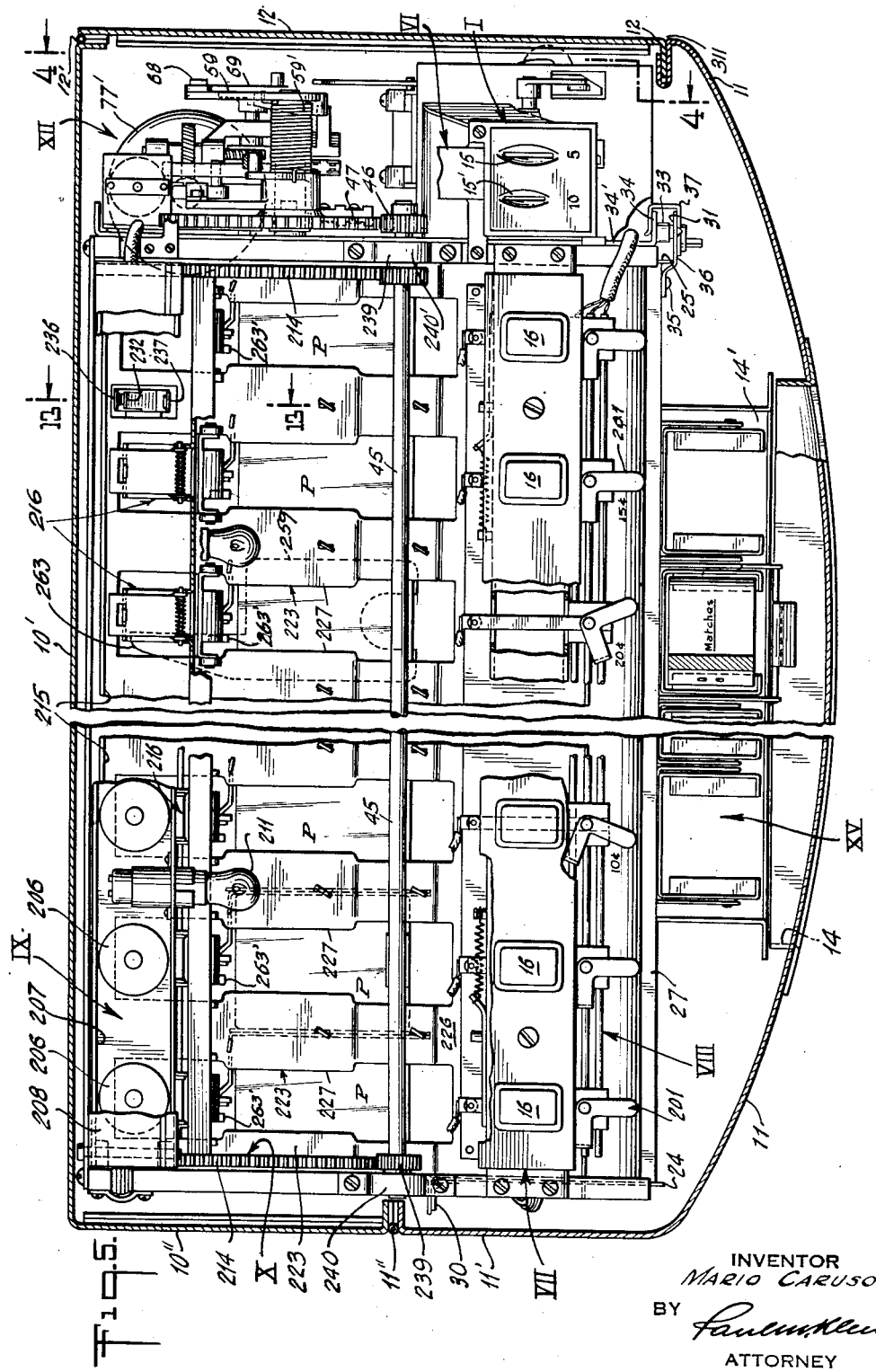
INVENTOR
*MARIO CARUSO.*
BY
ATTORNEY

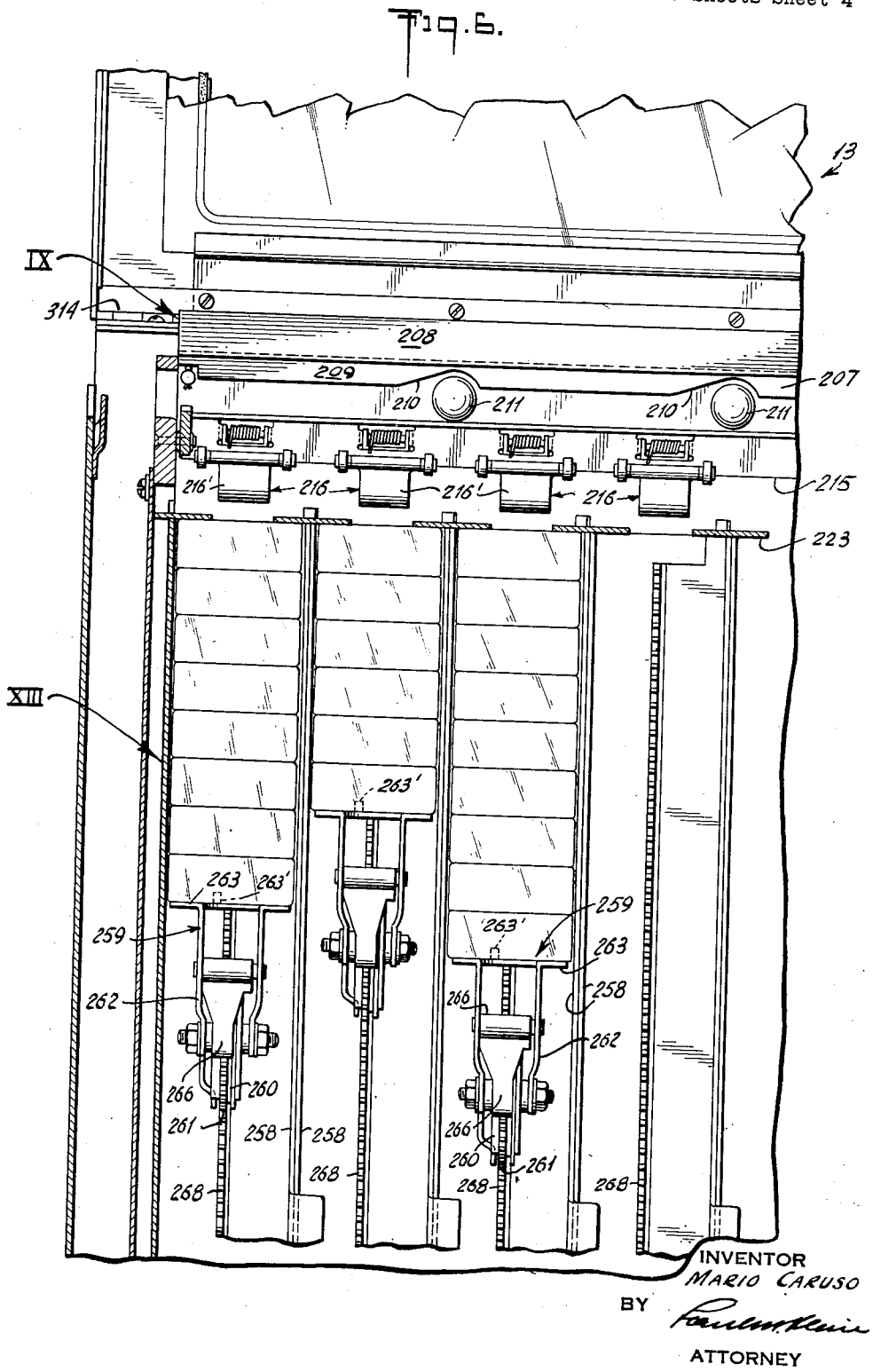

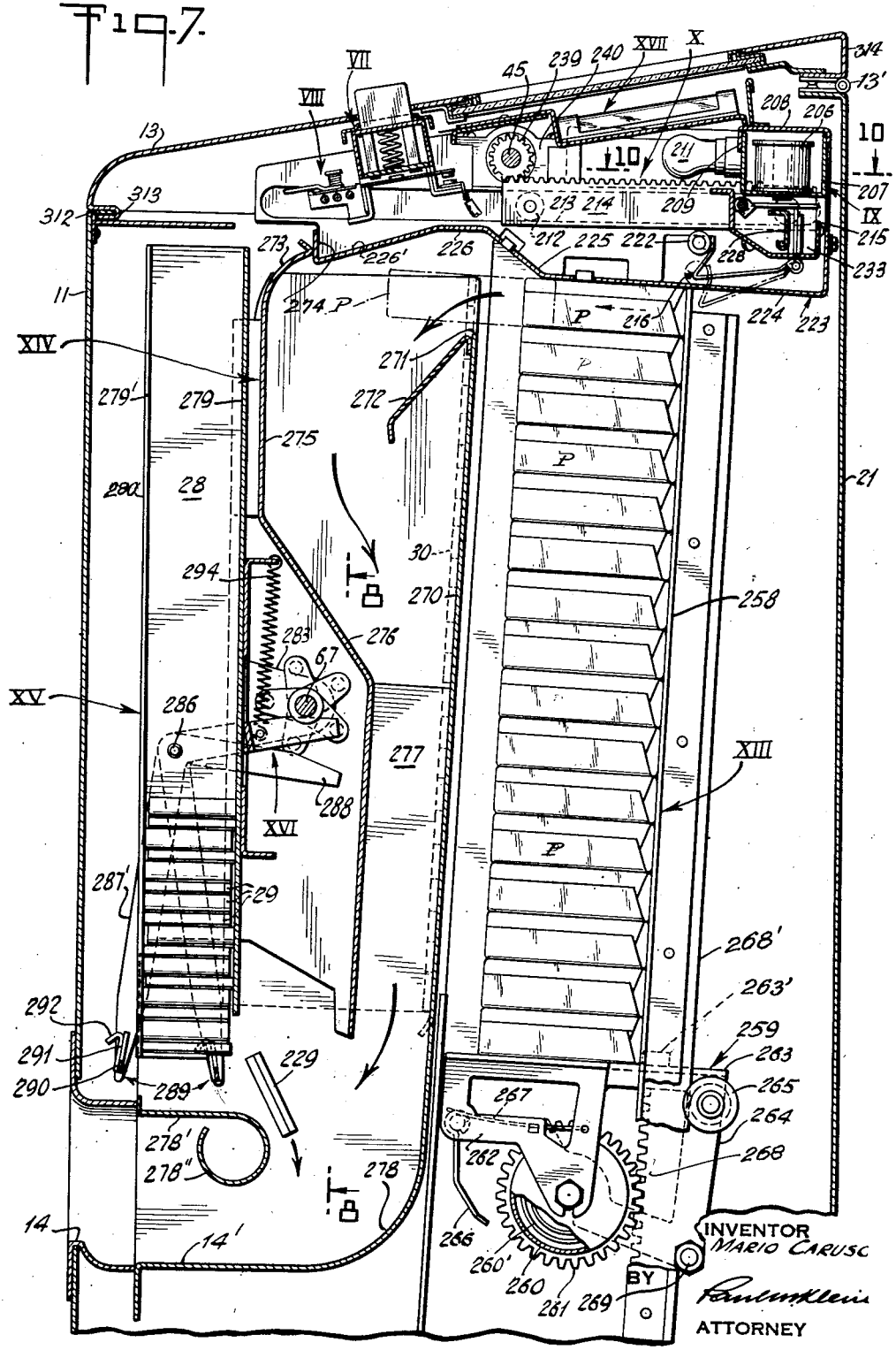

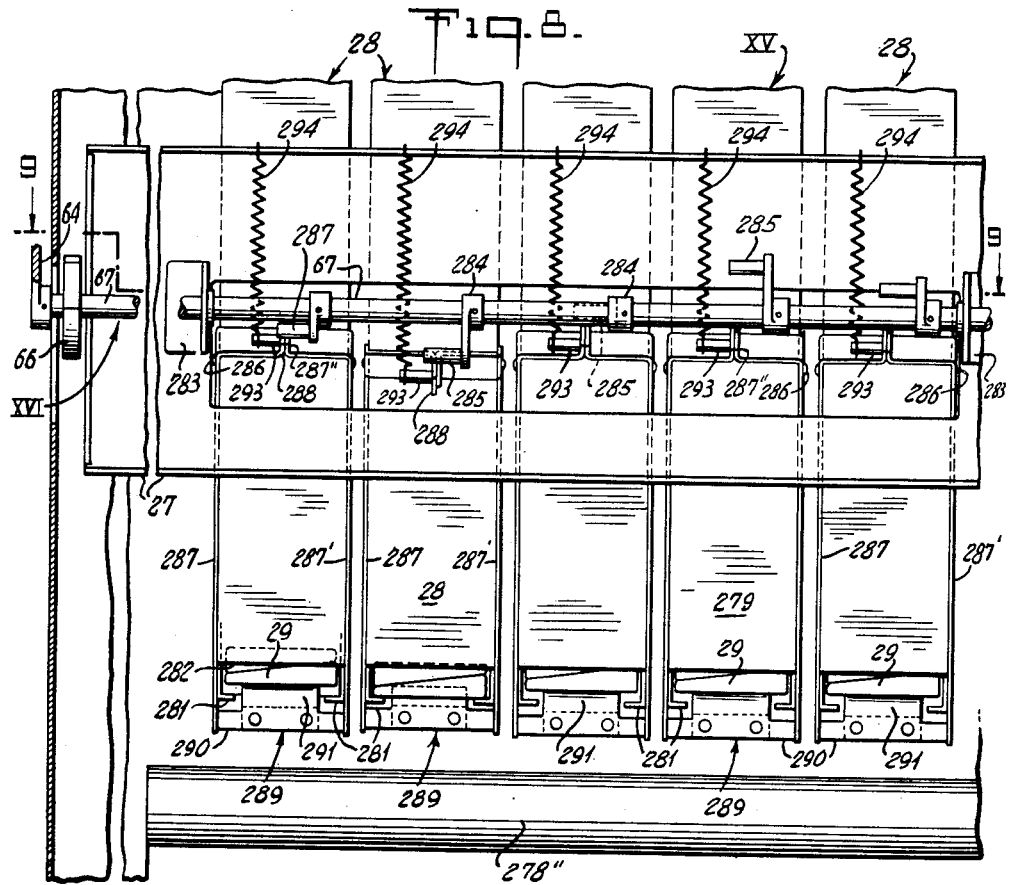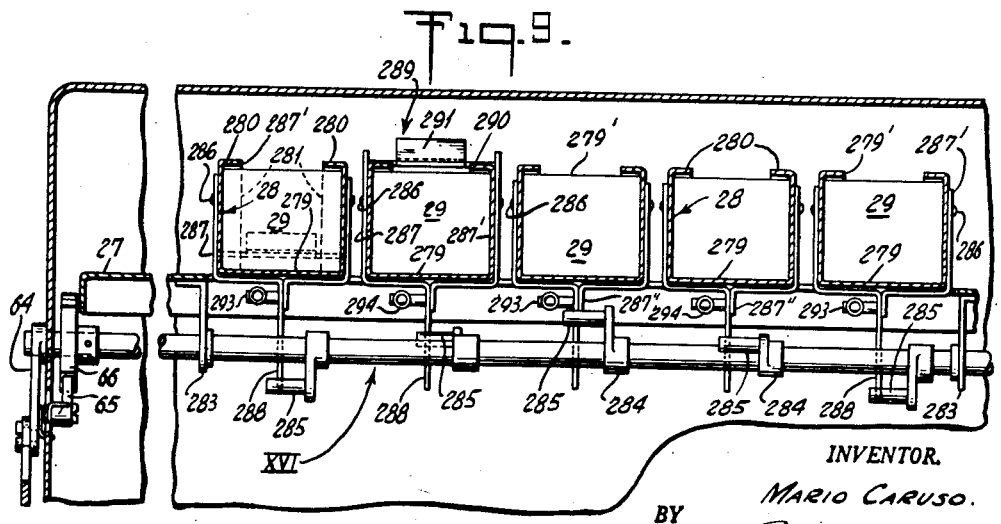

April 15, 1952     M. CARUSO     2,593,102
VENDING MACHINE
Filed Dec. 26, 1946     18 Sheets-Sheet 7
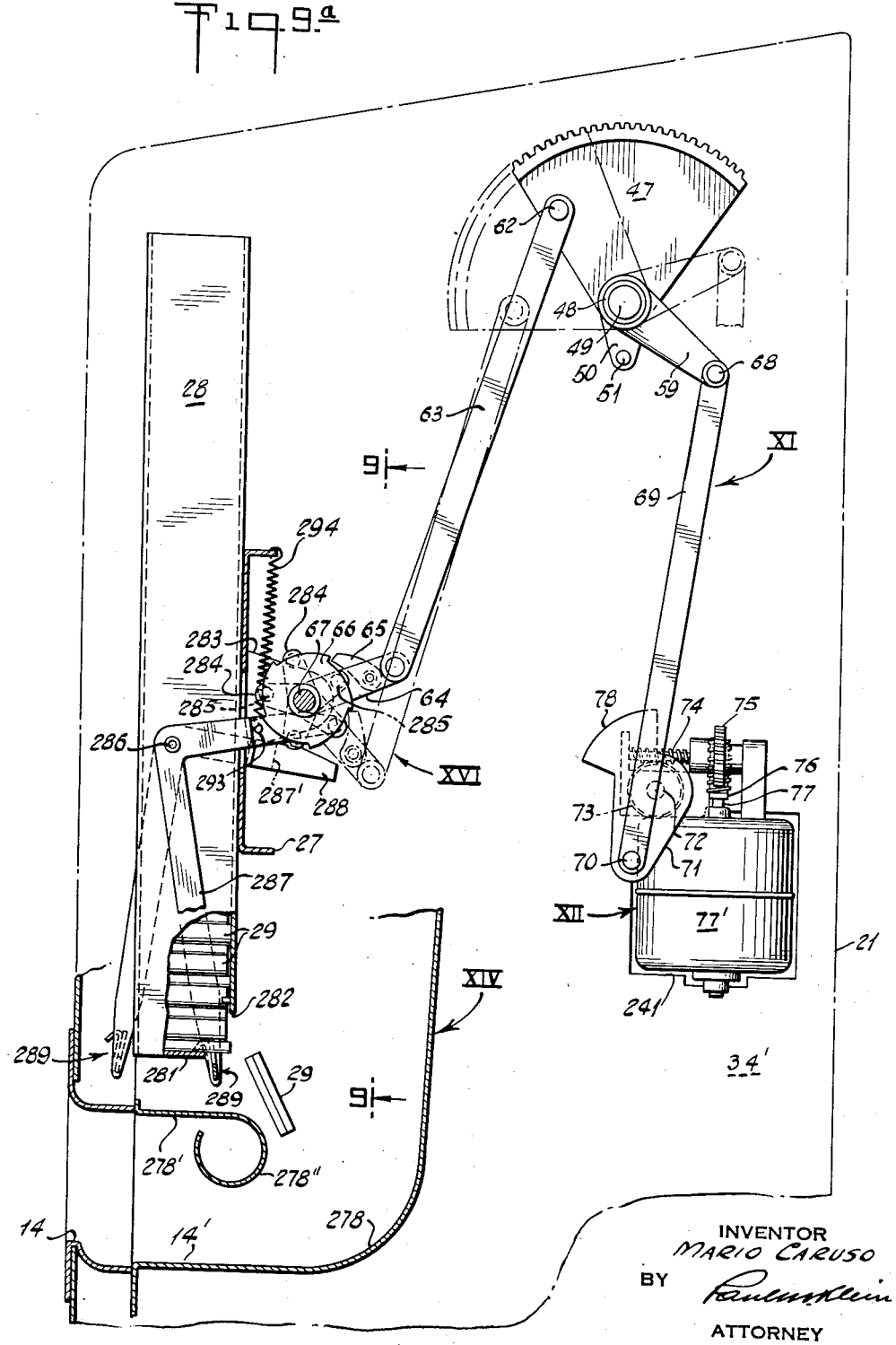
INVENTOR
MARIO CARUSO
BY Paul Klein
ATTORNEY

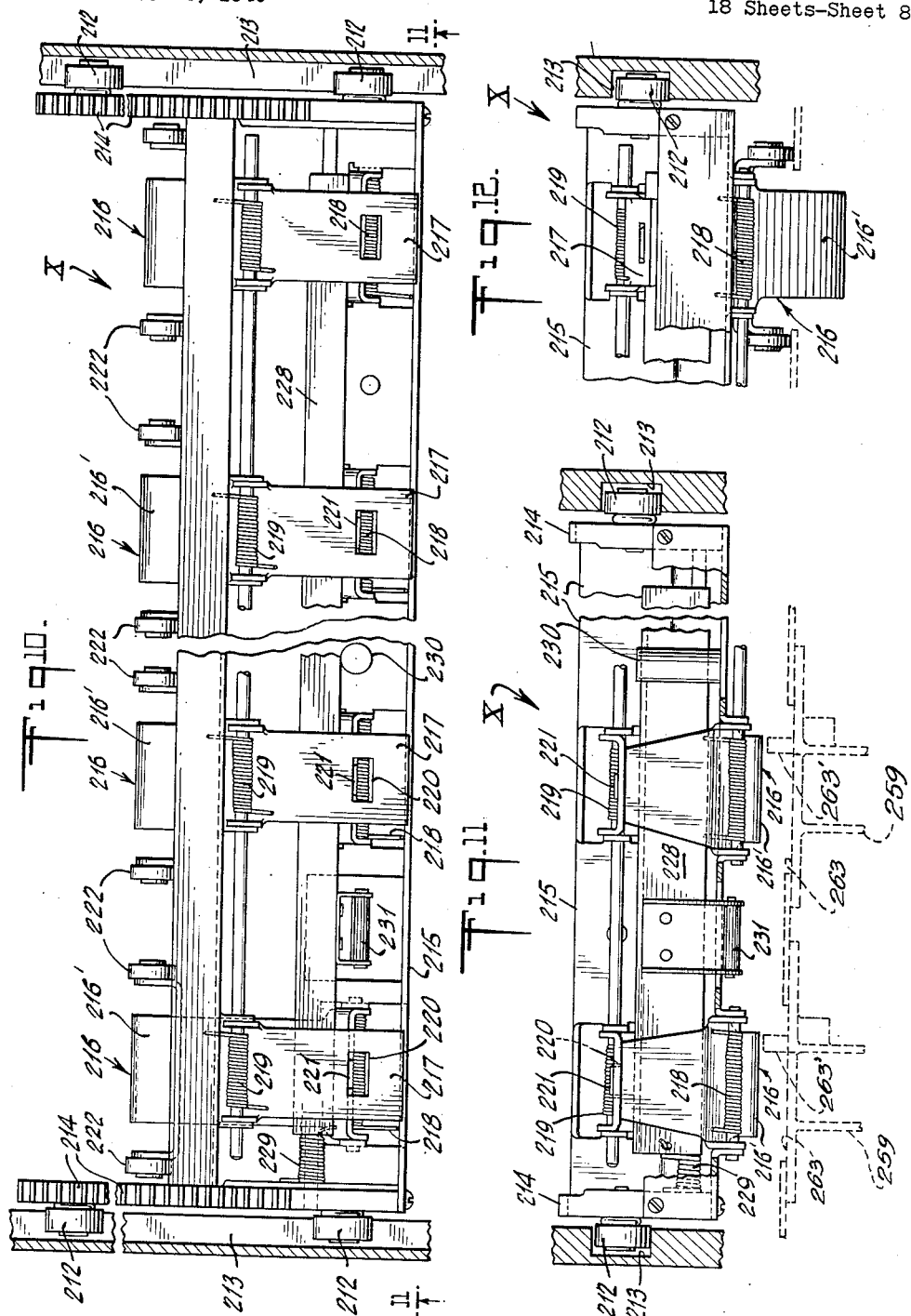

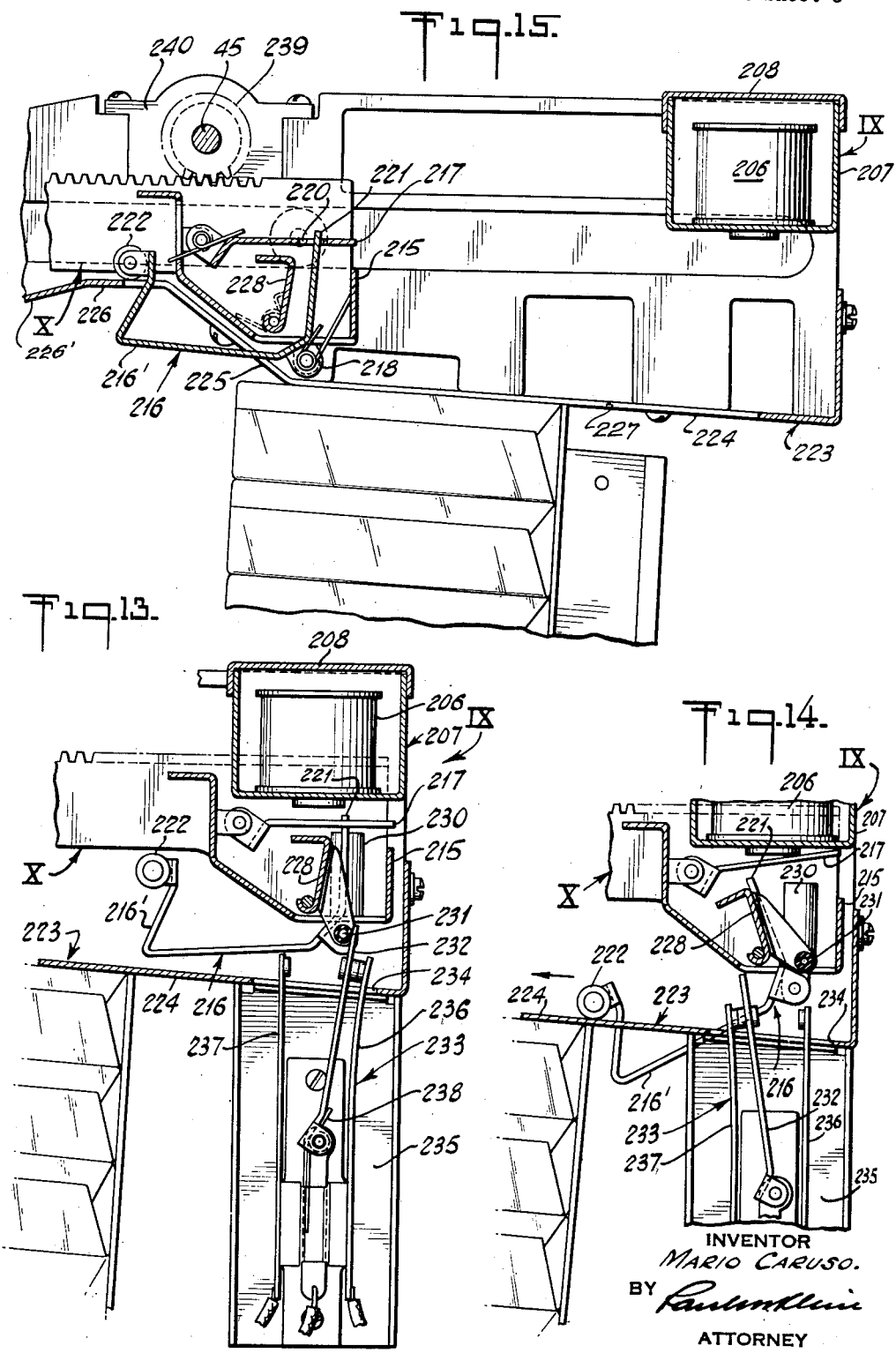

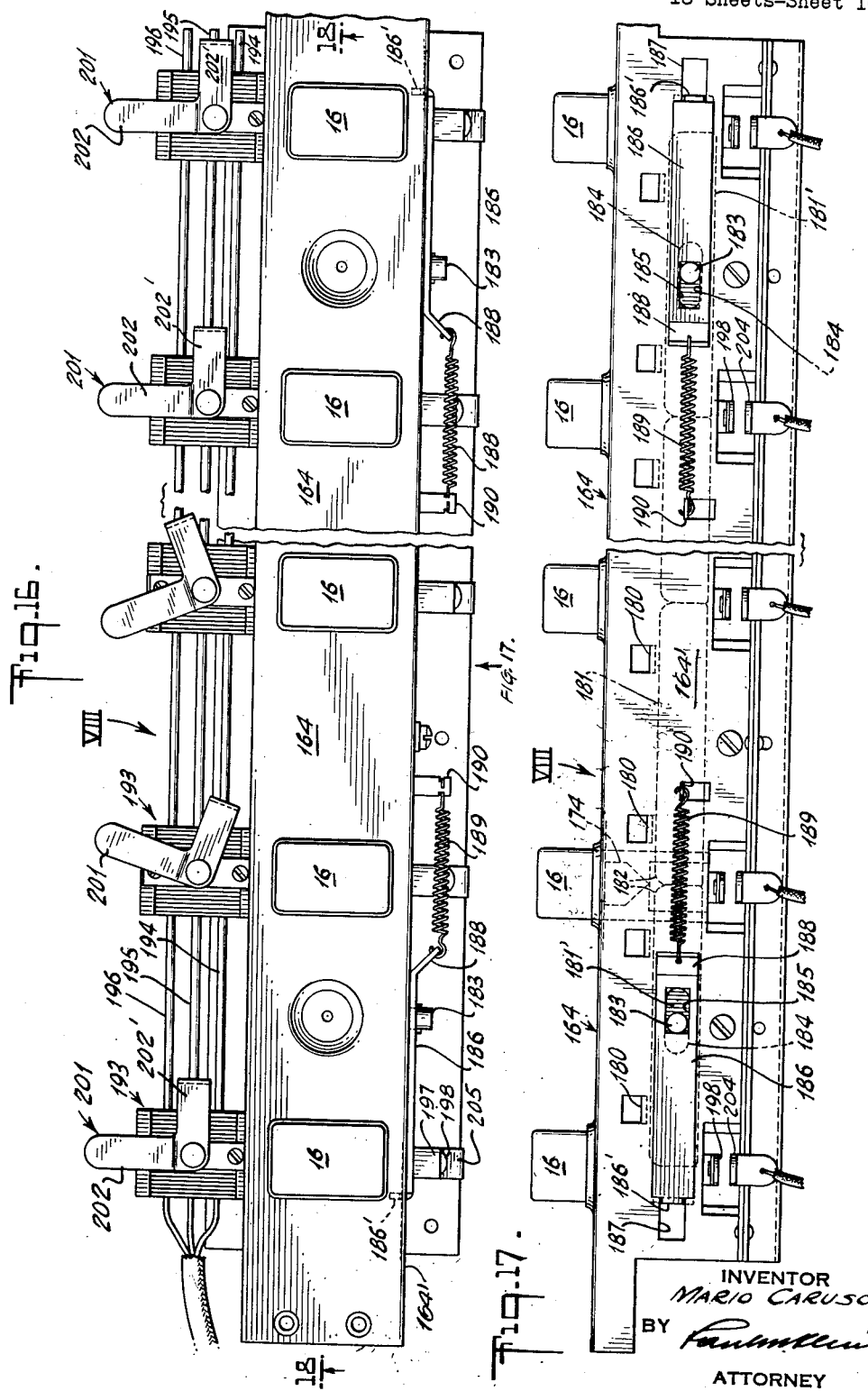

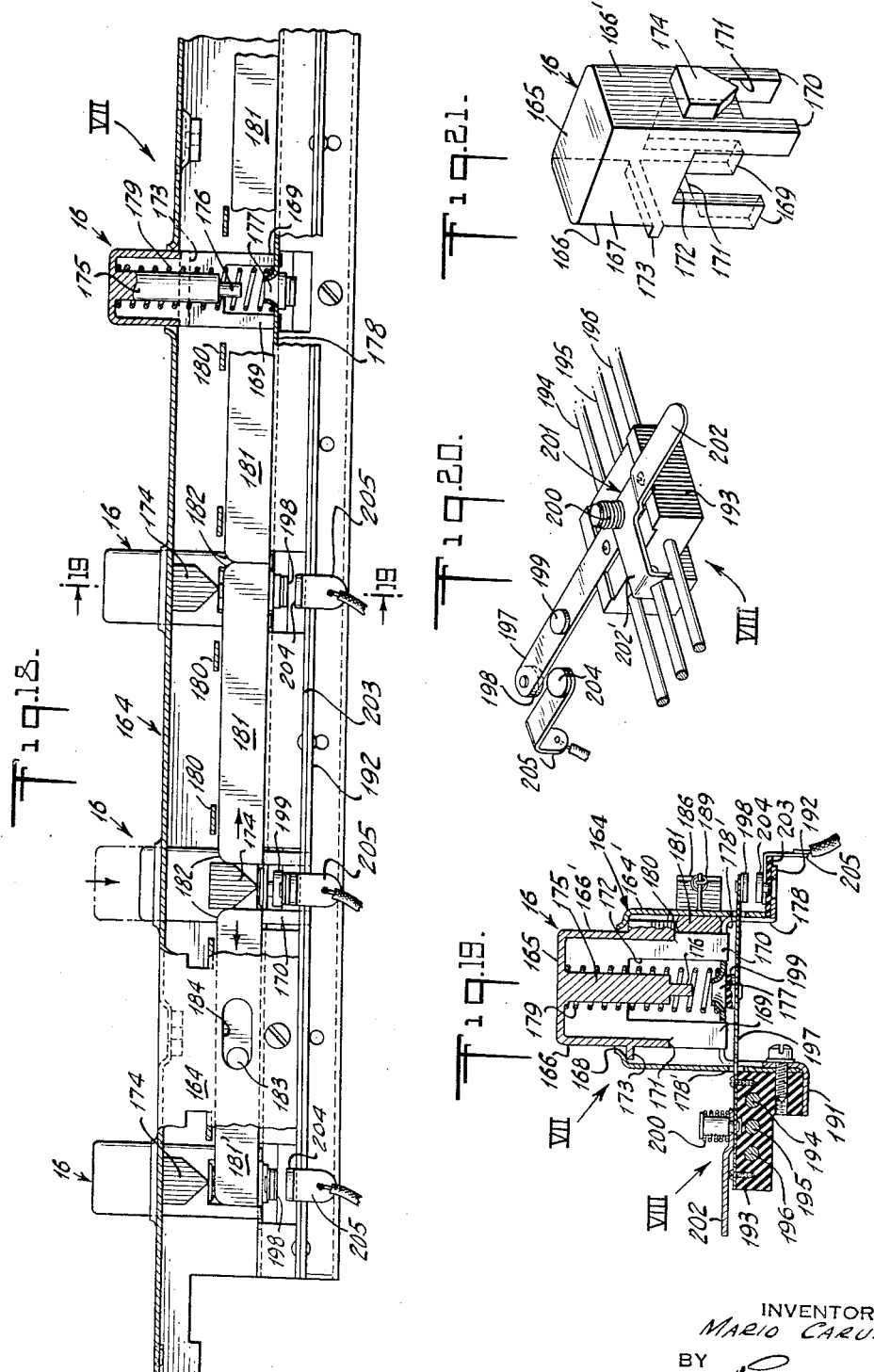
April 15, 1952
M. CARUSO
2,593,102
VENDING MACHINE
Filed Dec. 26, 1946
18 Sheets-Sheet 11
INVENTOR
MARIO CARUSO
BY
ATTORNEY

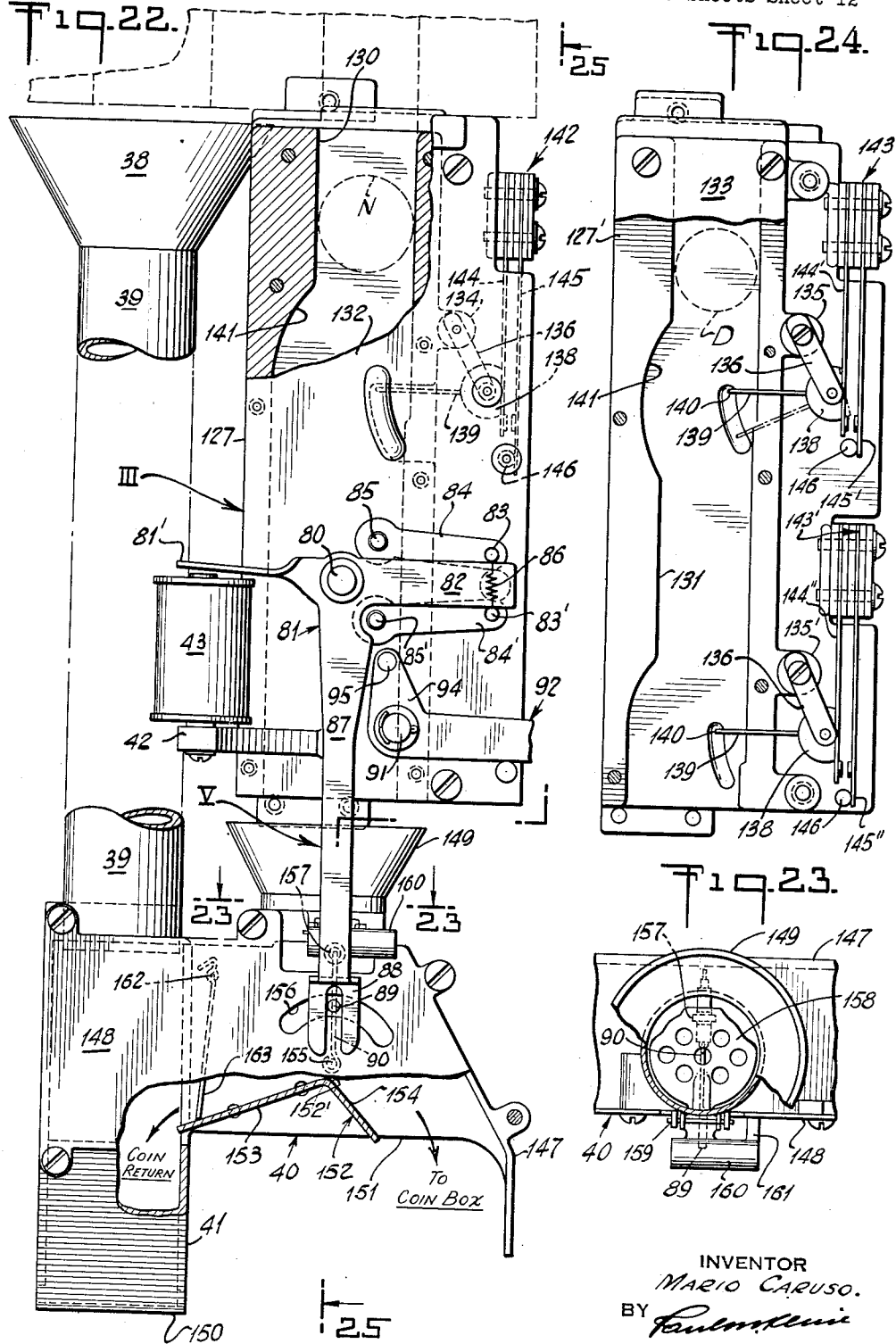

April 15, 1952
M. CARUSO
2,593,102
VENDING MACHINE
Filed Dec. 26, 1946
18 Sheets-Sheet 13
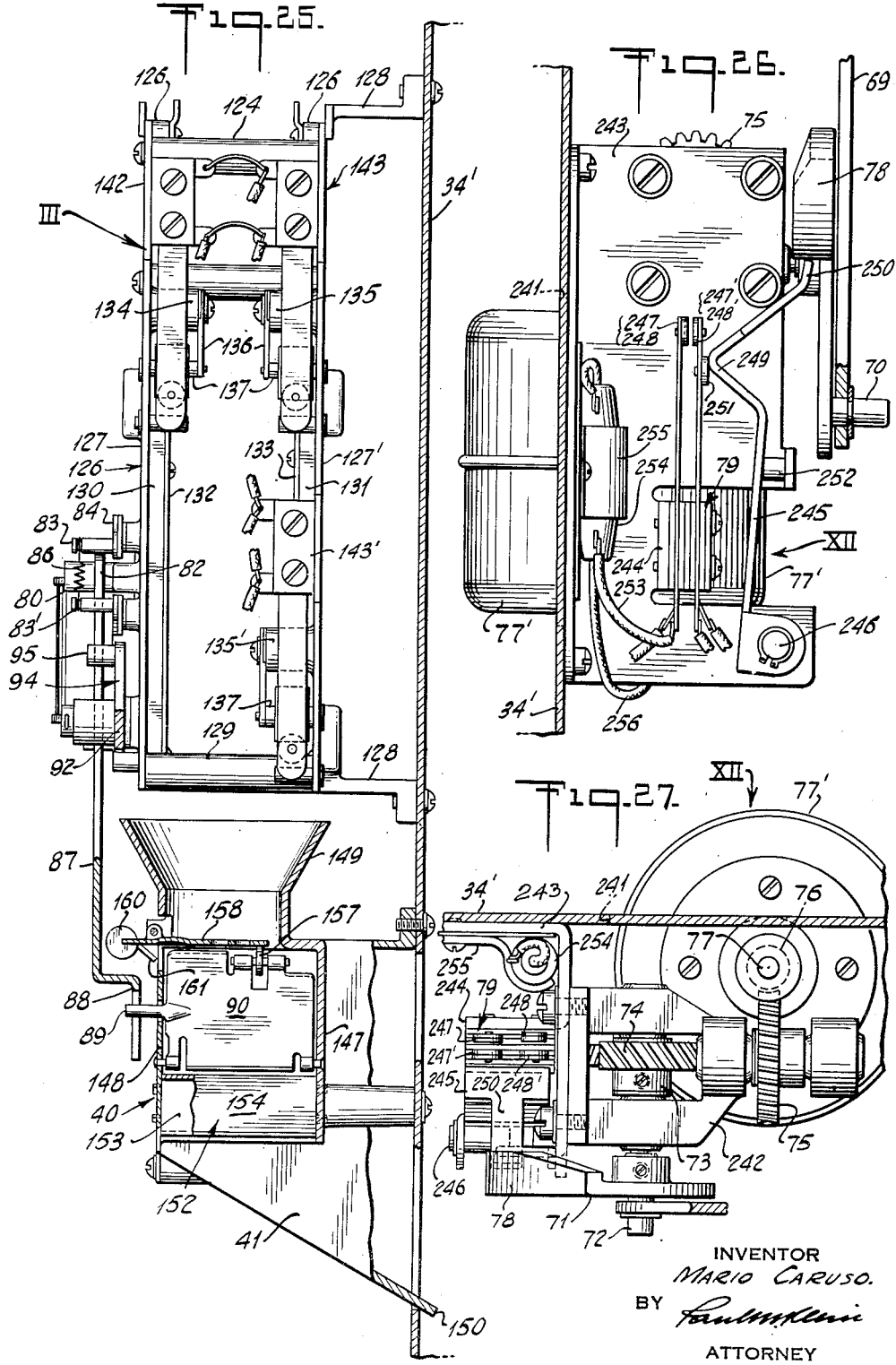
INVENTOR
MARIO CARUSO.
BY
ATTORNEY

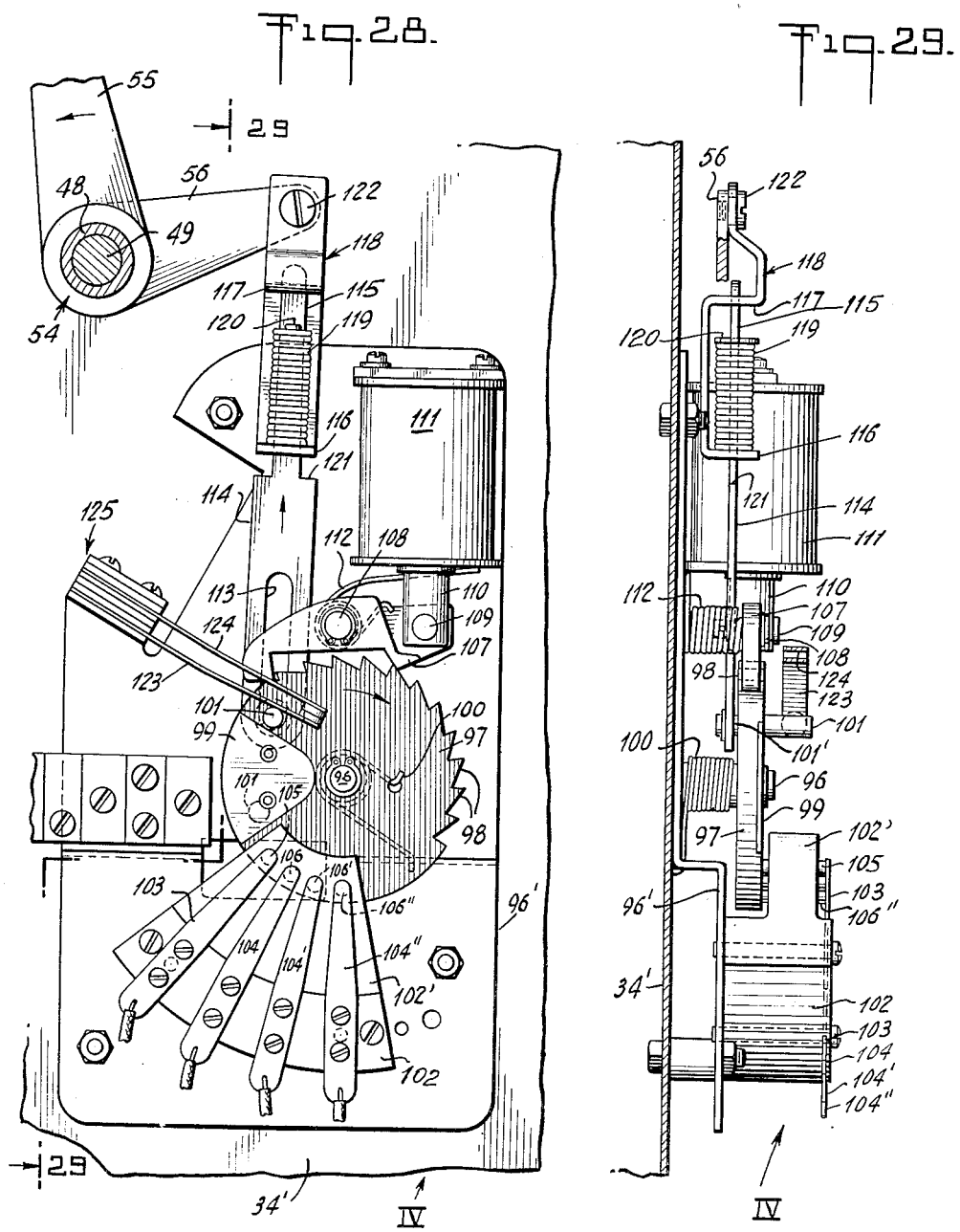

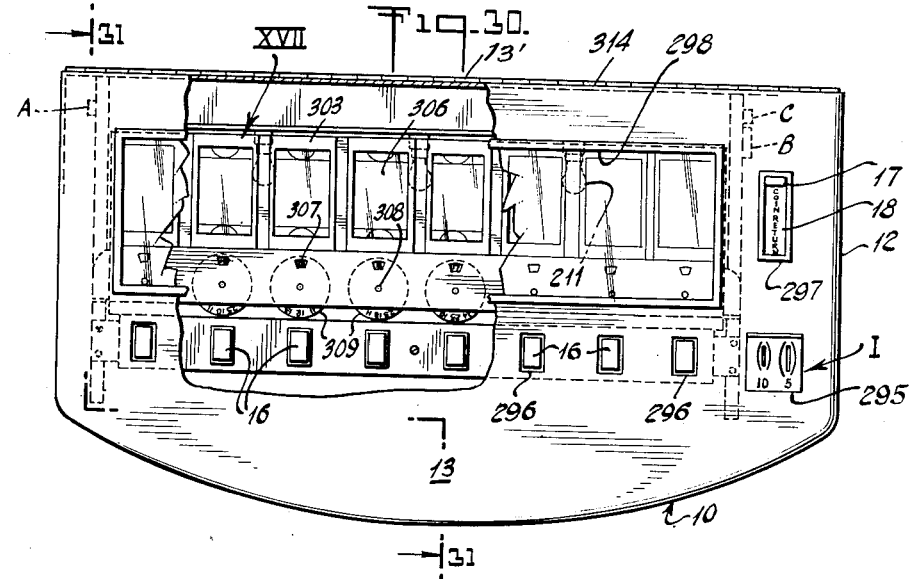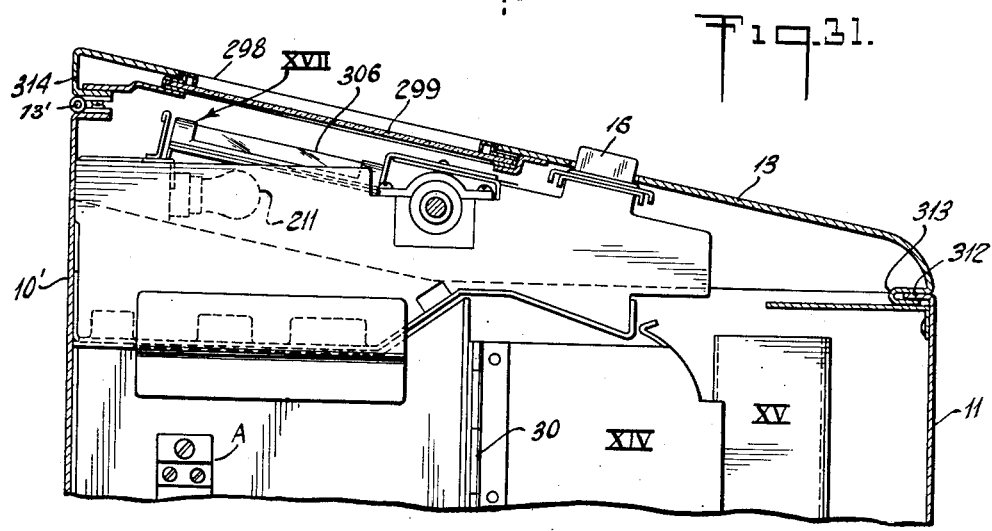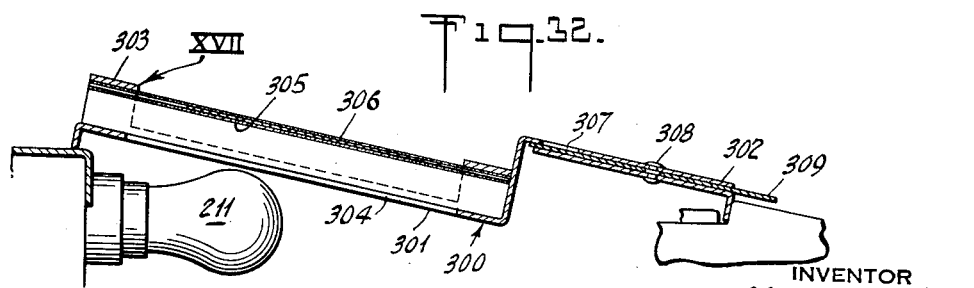

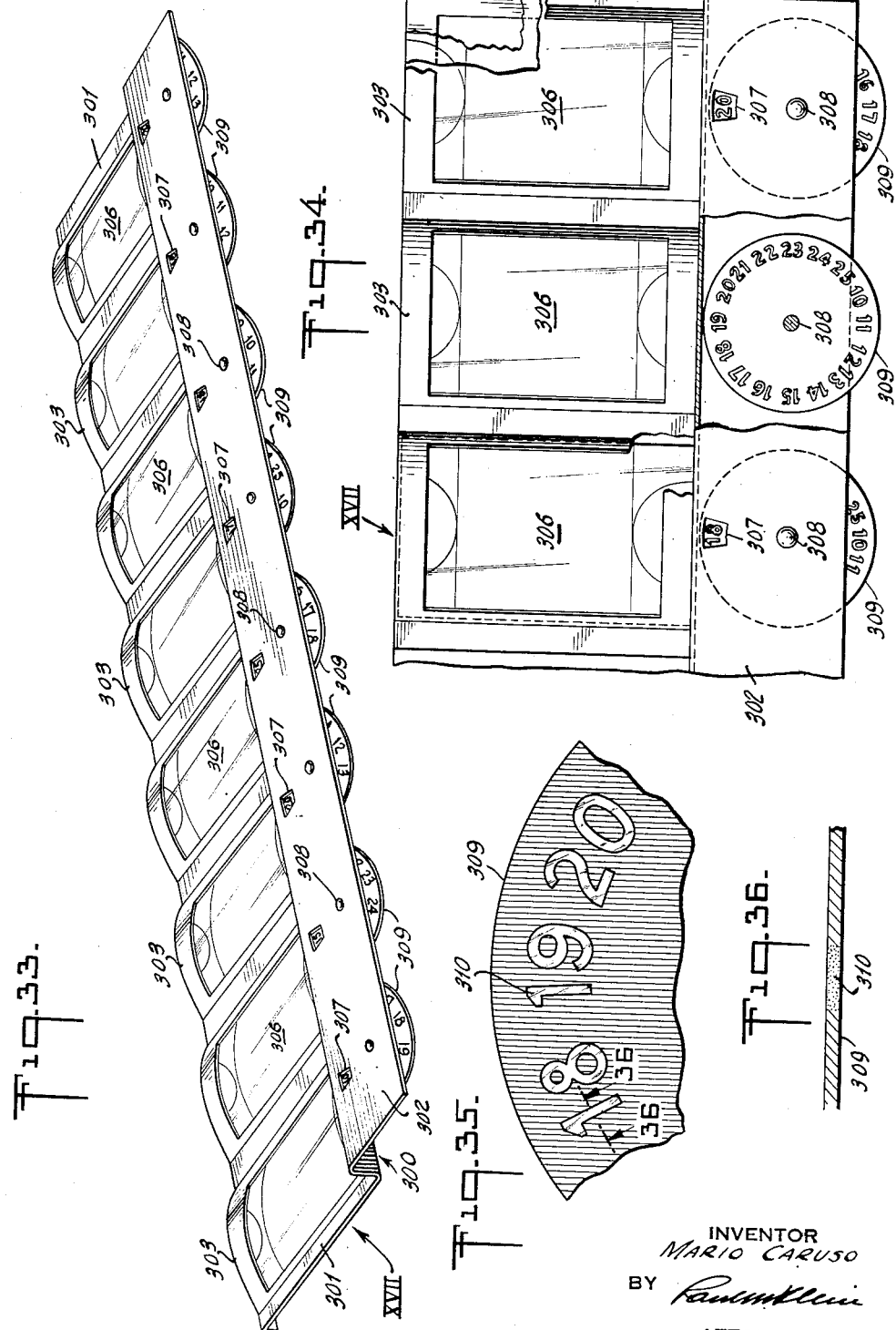

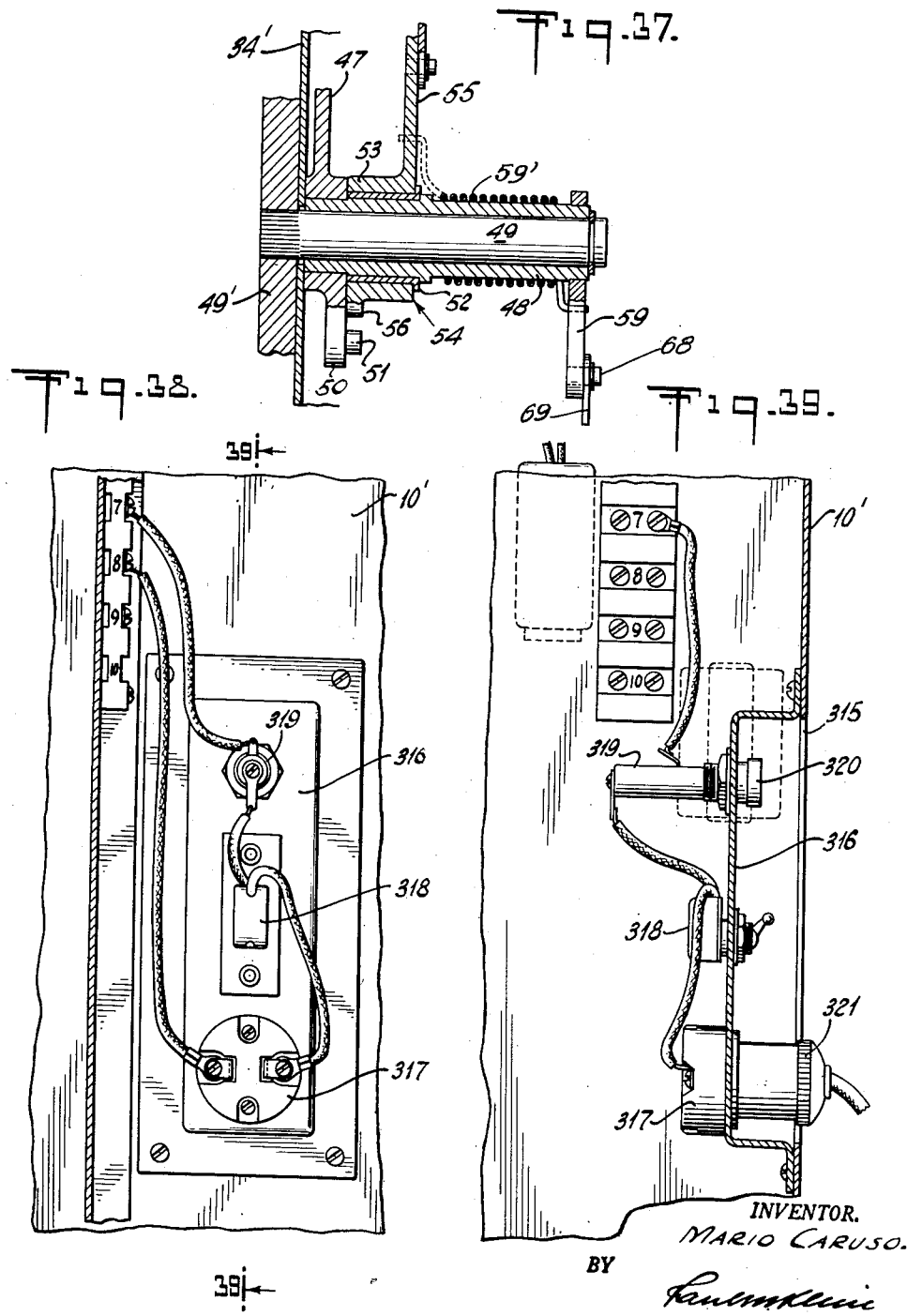

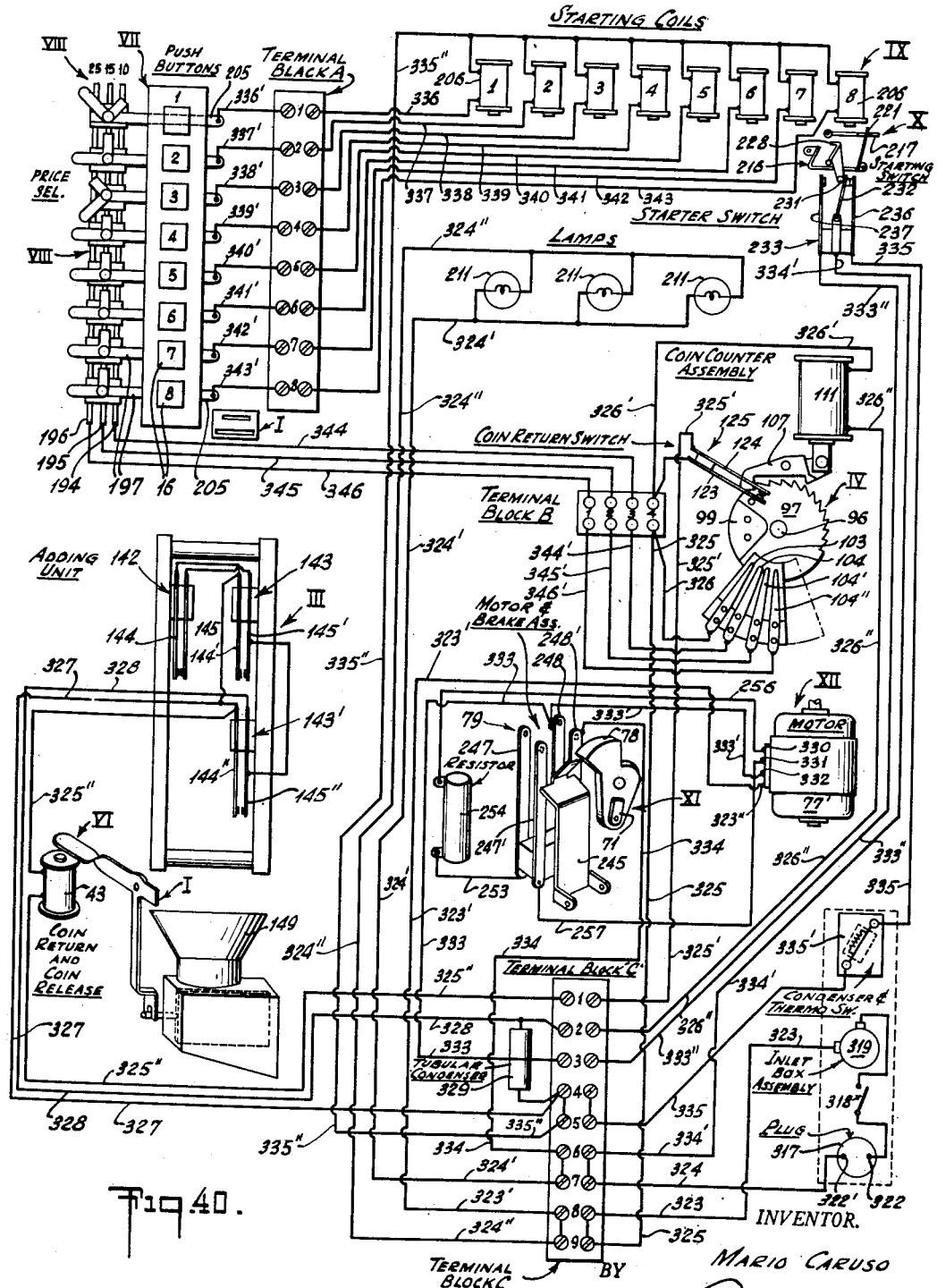

Patented Apr. 15, 1952

2,593,102

UNITED STATES PATENT OFFICE 2,593,102

VENDING MACHINE

Mario Caruso, Maplewood, N. J., assignor to
C-8 Laboratories, Newark, N. J.

Application December 26, 1946, Serial No. 718,529

7 Claims. (Cl. 312—63)

This invention relates broadly to coin-operated vending machines and the various instrumentalities employed therein, one of which being a merchandise supporting and elevating device, identified as Self-Propelled Traveling Device in co-pending application, Serial No. 591,733, filed May 3, 1945, now Patent No. 2,431,542, issued June 15, 1948.

In the present instance the apparatus disclosed is intended for dispensing packs of cigarettes, the main or principal articles, and books of matches, the minor or secondary articles, the delivery of both articles being simultaneous, although the device may serve for vending any other desired articles, or a combination of articles, without departure from the operating principle employed herein.

As is the case in most machines of the goods dispensing type, the present apparatus employs a rather complex operating mechanism composed of a plurality of individual, mechanically and electrically interconnected instrumentalities, each being designed for a specific function, and, in order to facilitate the understanding of the instant development, it seems advisable to enumerate, generally designated by roman letters, and briefly describe the functions of each of these principal, cooperating instrumentalities. Before thus designating and listing them, it is to be noted that the apparatus is designed to be operated electrically by simply connecting it to any suitable electric outlet, and that the electrified portions of the device partly actuate and partly cooperate with a plurality of mechanical structures, and that the device also includes manually operated parts. The listing of the various instrumentalities follows in the order of their successive functions when the mechanism becomes energized through the insertion of one or more coins.

*List of instrumentalities and their functions*

First there is provided a specially designed coin receiver I. For the sake of simplicity two coin slots are indicated, one for nickels, the other for dimes. Directly beneath the coin receiver is the second instrumentality, a coin tester II. Upon passage through the coin receiver, each coin must travel through this tester and is either accepted or rejected. The tester will reject a coin if it is either damaged, or if it does not correspond to the denomination indicated over the slots, or when a slug is placed into the machine instead of a coin. Unsuitable coins or slugs are immediately returned. The tester, as such, constitutes no part of the present invention.

The third instrumentality is an electro-mechanical coin adding unit III. This device is intended to check the amount represented by the number of coins inserted into the machine. It functions once upon the passage therethrough of a nickel, and twice when a dime is received. In other words it adds the amount deposited in units of five cent values. The adding of the amount deposited is electrically translated to an electro-mechanical counter IV, controlled by the adding unit, which counter is the fourth instrumentality on this list. The counter is moved to distinct positions, depending upon the number of nickels or their equivalent deposited in the machine, and at the same time it will close one to three or more electric circuits, the purpose and function of which will be explained presently.

In conjunction with the coin adding unit is the fifth part of the device mechanism consisting of a coin release V, which latter functions as an article is being dispensed by the machine.

The sixth instrumentality is a coin return VI, which is mechanically associated with the adding unit but is independent therefrom. The coin return is operated manually and comprises a combination of mechanical and electrical parts. Its handle portion is arranged above the coin slots, and, when operated, it closes an electric circuit to energize a solenoid. The latter actuates a coin release which returns the coins originally inserted in the machine.

The seventh instrumentality is an article selector VII, facilitating the purchase of the merchandise desired, in this case a pack of cigarettes of any of the brands carried by the machine. There is provided in the selector a row of push buttons, one for each of the brands. The button structure is so designed that only one button may be depressed at a time, and upon release, such button automatically returns to its normal, upward position. Each of the buttons controls an individual electric contact switch. All switches remain normally open, and only one of the switches may be closed at one time when its corresponding button is depressed.

Combined with the article selector is an electric price-setting assembly VIII, forming the eighth part of the mechanism. It is electrically connected with the electric counter, and by its setting controls the number of five cent units required to release the different articles selectable through the several buttons.

The ninth instrumentality is a solenoid assembly IX, consisting of a series of solenoids controlled by the individual switches operated by the buttons of the article selector.

The tenth portion of the mechanism is the article ejector assembly X, comprising a carriage adapted for one forward and one rearward movement during one operating cycle. Its operation follows the depression of one of the individual buttons and the consequent closing of one of the switches, whereby one of the solenoid units becomes energized and releases the carriage for operation. The article ejector assembly becomes then actuated by the eleventh instrumentality, designated as actuating assembly XI, which latter comprises a combination of levers, gears, gear racks and gear segments operated by a motor assembly XII, forming the twelfth part of the mechanism.

The thirteenth instrumentality is the magazine or holder XIII for the principal articles to be dispensed, some of the structure and arrangement of which is disclosed in the aforementioned copending application, and which article holder is intended to bring the individual articles within the range of operation of the article ejector assembly.

The next following portion of the mechanism is the delivery chute XIV for the main articles, the cigarette packs, and is fourteenth on the list, while the fifteenth instrumentality is a holder XV for secondary articles, in this case book matches. Forming a part of the match holder is a match ejector XVI, constituting the sixteenth part of the mechanism. The match ejector operates simultaneously with, but independently from the article ejector.

The top or cover of the device is provided with suitable apertures, not only for the article selector buttons, the coin slots and the coin return, but has a large window for rendering visible a combination article display and price indicator assembly XVII. The latter is composed of individual article display and price indicator units for each of the selector buttons, and forms the seventeenth part of the mechanism.

The principal electrical and mechanical parts of the mechanism having been indicated, the device includes several miscellaneous items, for instance, a removable coin receptacle beneath the coin release of the coin adding unit, and other minor but necessary instrumentalities, such as parts of the actuating assembly, all of which will be more fully identified, and their purpose and function explained, as this specification progresses. The above general enumeration and brief description of the several principal parts of the machine's mechanism is intended to facilitate a better understanding of their working principle, their co-relation to one another, and their successive operations.

As is common in most coin-operated dispensing machines, the required amount in coins is inserted into the slots of the coin receiver I, whereupon the coins pass through the coin tester II to determine whether or not the inserted coins are acceptable. If slugs or incorrect coins are inserted they are returned to the prospective purchaser. When the coins have successfully passed the coin tester, they enter the coin adding unit III, which in turn actuates the electric counter IV. The coins are held ready for the operation of coin release V, but may be returned to the prospective purchaser when the coin return VI is manually operated. The electric counter by its function prepares for operation the article selector VII through the price setting assembly VIII, which is controlled by the counter. When one of the article selector buttons is depressed, one of the units of the solenoid assembly IX becomes energized, which in turn releases the article ejector assembly X for operation. Simultaneously the actuating assembly XI commences to operate, being driven by the now energized motor assembly XII. Actuating assembly XI moves the article ejector assembly X and operates coin release V. The released coins are deposited in a receptacle. The operating cycle of the actuating assembly includes the return of the article ejector assembly to its original, inactive position, its starting position.

As the main article, in this case a pack of cigarettes, is being ejected from the main article magazine XIII into delivery chute XIV, a book of matches, held in match holder XV, is simultaneously delivered by match ejector XVI into delivery chute XIV.

The display and price indicator assembly XVII facilitates the selection of the desired brand of cigarettes and tells the puchaser the amount required for its delivery by the machine.

In the event the prospective purchaser wishes the return of the coins inserted, he may have the coins returned before depressing an article selector button, by merely operating the coin return VI conveniently located near coin receiver I.

Having thus outlined the principal parts of the mechanism and their respective functions, one of the main objects of this invention is the provision of a vending machine for dispensing a multiplicity of articles and being of a unique, compact and relatively simple construction, wherein the principal or main articles to be dispensed are brought to their ejecting position by an automatically upwardly moving support or platform, and wherein at least another or secondary article is delivered simultaneously with each dispensed main article, and wherein a plurality of combination electrical and mechanical means are employed for selectively ejecting a main article together with a non-selective secondary article, and wherein the entire device constitutes a rather low-set, space saving, readily portable structure which, due to its shape and size, is easily accessible, thus facilitating the replenishing of both main and secondary articles and the removal of the coins received by the machine.

A more specific object of the invention is the provision in an article dispensing device of a coin adding unit operative in conjunction with an electric counter, whereby is determined the correct amount of coins required for the purchase of any of the main articles dispensible from the device.

Another object of this invention is the provision of an automatic coin release which becomes actuated at the time an article is being dispensed.

A further object of this invention is a manually operable coin return, which functions independently from all other parts of the device mechanism.

Still another object of the present invention is an article selector provided with a series of coacting, individually depressible selector buttons, the selector being so designed that each of the buttons, when depressed, will positively prevent the operation of any other button, and wherein each momentarily depressed button will, upon its release, immediately revert to its normal, elevated position, and wherein each of the buttons also functions as an individual electric switch device, which closes an electric circuit, when depressed, and automatically opens the circuit when released.

A further object of the present invention is an electric price setting assembly, forming a component part of the aforesaid article selector, and in which price setting assembly are employed for each button of the selector a price setting lever which may be set to at least three different positions to determine at any one of its positions the number of five cent units required for the purchase of an article dispensible by the depression of its corresponding button.

Still another object of this invention is the combination with an article selector, of a correlated price setting instrumentality, and wherein the article selector constitutes a series of individually depressible buttons, and wherein means are provided which are so arranged that when one of the buttons is depressed, the depression at the same time of any other button is positively prevented, and wherein each of the buttons also serves as a contact maker and breaker for the said price setting instrumentality.

Another object of this invention is the provision of an electro-magnetically controlled article ejector assembly, including a series of solenoids, their number corresponding to the number of article columns from which individual articles are to be dispensed, and also corresponding to the number of buttons of the aforesaid article selector and to the number of individual switches controlled by these buttons, and which article ejector assembly controls and actuates a main switch assembly which governs the supply of electric current to a motor assembly and to the actuating mechanism for operating the article ejector assembly, driven by the motor assembly.

Another object of this invention is to provide, as part of the article ejector assembly, individual article ejectors, normally held in inoperative position until one of the article selector buttons is actuated, whereby such individual article ejector is released to engage and cause the discharge of the article selected, and wherein the release of any one of the individual article ejectors will cause the operation of a common trip bar for closing a main switch, whereby a motor driven instrumentality is caused to actuate the article ejector assembly to dispense the selected article.

A further object of the present invention is to provide a motor driven actuating instrumentality for the article ejector assembly, including a circuit holding switch and a resistor, the latter constituting brake means for retarding the speed of the motor toward the end of completion of its operation, and which actuating instrumentality further includes a combination of mechanical elements adapted to operate not only the article ejector assembly, but also the holding switch and a coin release.

Another object of this invention is the combination with a dispenser for main articles, of a dispenser for secondary articles, and in which latter dispenser is provided a continuously and independently movable secondary article ejector, operative, however, by the actuating means for the main article ejector.

Still another object of the present invention is to provide, in combination with the main article dispensing device, a secondary article dispensing device, which latter is movable relative to the former, so that it may be swung away from or towards the main article dispenser, and which secondary article dispenser is provided with means for locking it in correct position relative to the main article dispenser.

An additional object of this invention is to provide, in conjunction with an article dispenser of the type indicated, a combination display and price indicator, the latter including adjustable means provided with numerals or indices, and wherein one of the numerals or indices may be rendered prominently visible to indicate the exact amount required for the purchase of a selected article.

The foregoing and still other important objects and numerous additional advantages of the present invention will become more fully understood from the ensuing description, in connection with the accompanying drawings, wherein:

Fig. 1 is a front elevation, and

Fig. 2 is a side elevation of the device in its presently preferred form and in accordance with the present invention;

Fig. 3 is a front elevation of the device with the outer cover removed;

Fig. 5 is an enlarged top view of the device, shown partly in section along line 5—5 of Fig. 4, and disclosing portions of the controls and of the article ejector assembly;

Fig. 6 is a fragmental front elevation of the main article magazine, partially in section, and disclosing the self-propelled article supports;

Fig. 7 is a fragmental vertical cross section through the device showing the relative disposition of the main article magazine, the magazine for matches, the ejector instrumentalities for both magazines and the chutes;

Fig. 8 is a rear view of the match magazine and of the match ejector as seen in the direction of arrows 8—8 of Fig. 7;

Fig. 9 is a horizontal cross section taken on line 9—9 of Fig. 8;

Figure 4:
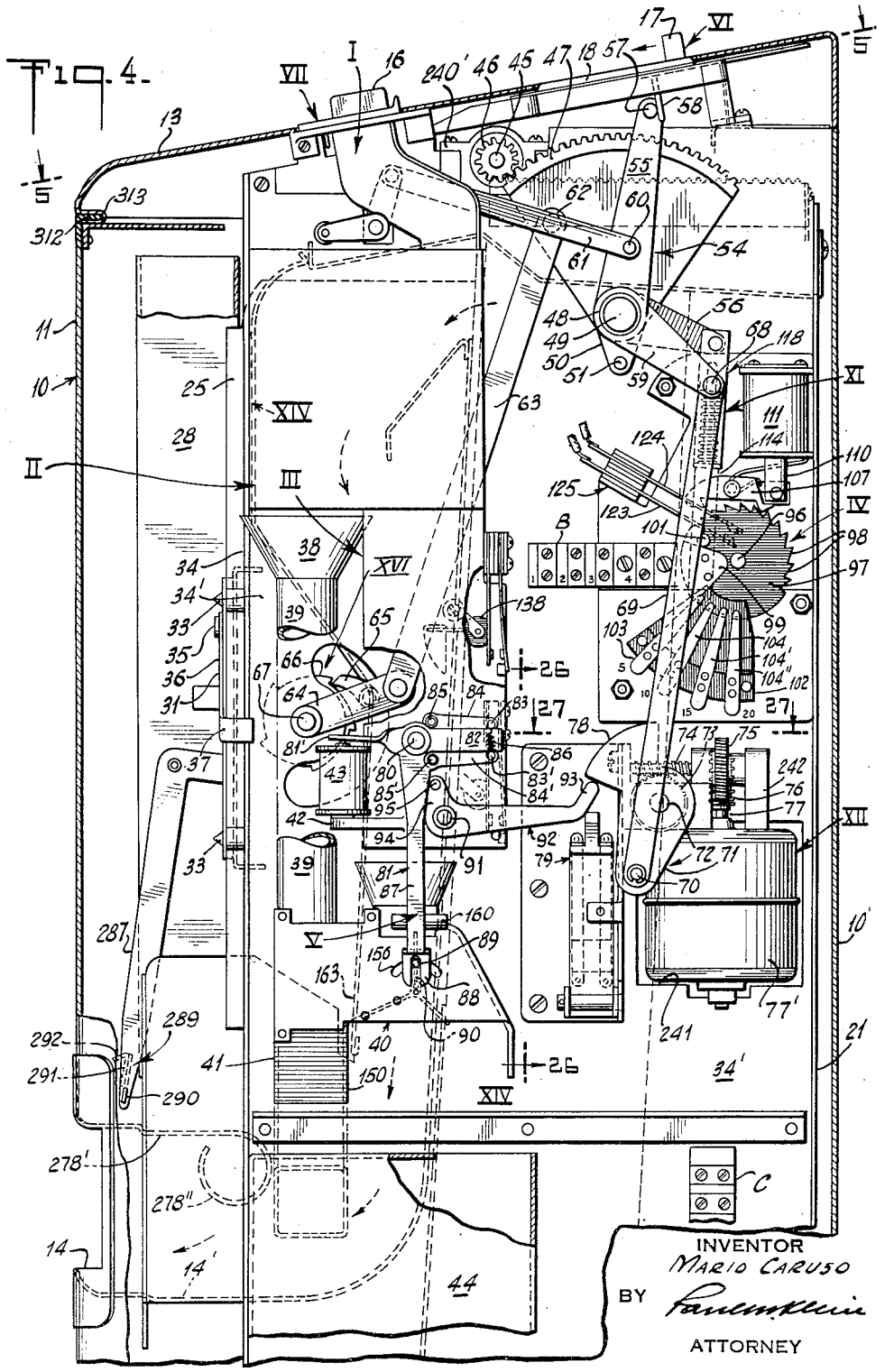
Fig. 4 is a fragmental enlarged side elevation, partially in section, along line 4—4 of Fig. 5, disclosing some parts of the operating mechanism.

Fig. 9a discloses a fragmental side view illustrating the actuating means for the match ejector;

Fig. 10 is a fragmental top view of the cigarette ejector assembly as seen in the direction of arrows 10—10 of Fig. 7;

Fig. 11 is a fragmental end view observed in the direction of arrows 11—11 of Fig. 10;

Fig. 12 is a similar fragmental end view of one of the ejectors in its released position;

Fig. 13 is an enlarged fragmental section taken on line 13—13 of Fig. 5 and disclosing portions of the ejector assembly in inoperative position, and the main or starter switch in its starting position;

Fig. 14 is a similar section with the ejector assembly in operative position and with the starter switch in a motor energizing position;

Fig. 15 is a fragmental detail view, partly in section, of the ejector assembly in its extreme forward position;

Fig. 16 is a fragmental plan view of the combination selector button assembly and price setting mechanism;

Fig. 17 is an end elevation thereof seen in the direction indicated by arrow in Fig. 16;

Fig. 18 is a vertical cross section taken approximately on line 18—18 through Fig. 16 with one of the buttons in depressed position, and with another button shown in section;

Fig. 19 is a vertical section taken on line 19—19 of Fig. 18;

Fig. 20 is a fragmental perspective detail view illustrating the switch contacts controlled by the article selector buttons;

Fig. 21 is a perspective detail view of a button structure;

Fig. 22 is an enlarged detail illustration, partially in section, of the exterior portion of the coin adding unit, the coin control box and the coin release mechanism;

Fig. 23 is a fragmental top view and section taken on line 23—23 of Fig. 22;

Fig. 24 is a side elevation of the interior portion of the adding unit;

Fig. 25 is an end view of Fig. 22, partially in section, taken on line 25—25 of Fig. 22;

Fig. 26 is a fragmental detail illustration of the motor assembly and of a double holding switch and its operating mechanism;

Fig. 27 is a top view of Fig. 26;

Fig. 28 is a fragmental detail front elevation of the electric coin counter and of some of the manually operative coin return instrumentalities;

Fig. 29 is a partial side elevation and section taken on line 29—29 of Fig. 28;

Fig. 30 is a top view of the vending machine, with portions of its outer casing removed, disclosing the combination display and price indicator;

Fig. 31 is a fragmental enlarged section taken on line 31—31 through Fig. 30;

Fig. 32 is a partial, enlarged section through the combination article display and price indicator;

Fig. 33 is a perspective view of the combination article display and price indicator;

Fig. 34 is a fragmental plan view thereof with some of its portions removed;

Fig. 35 shows an enlarged part of a dial used in the price indicator;

Fig. 36 is a section taken on line 36—36 of Fig. 35;

Fig. 37 is a fragmental detail view in section of parts of the operating mechanism of the device;

Fig. 38 is an elevation and inside view of portions of the cabinet of the device supporting several electric appliances;

Fig. 39 is a section taken along line 39—39 through Fig. 38; and

Fig. 40 is a wiring diagram of the device.

Referring now specifically to the figures, in Figs. 1 and 2 is illustrated the device as it appears in its finished form. The closure or cabinet, shown in section in Fig. 5, houses the mechanism of the device, and is indicated generally as structure 10. It consists of four parts, a fixed back 10′, including a left side portion 10″, an openable front 11, including a portion of the left cabinet side 11′, and being hingedly connected at 11″ with left side portion 10″; right side 12, hinged to the back at 12′, and cover 13, hingedly associated at 13′ with the top edge of back 10″, see Fig. 31. Into the outwardly bowed front 11 there is set an oblong frame 14, through which articles dispensed by the machine, as well as returned coins may be removed as they are ejected into mouth 14′ of delivery chute XIV. The lower, inwardly directed portion of frame 14 abutting the bottom edge of chute mouth 14′ is depressed so that the front edge of the frame forms an upward stiffening ridge for engaging the lower edge of the opening provided in the front panel of the cabinet for the reception of frame 14, whereby a retainer for articles delivered into the chute mouth is produced. In the cover are provided several vertically directed apertures for accommodating some parts of the mechanism, such as coin receiver "I" provided with nickel and dime slots 15 and 15′, respectively, buttons 16 of the article selector VII, actuating element or handle 17 and name plate 18 of the coin return mechanism VI. In addition the cover has a large opening above the individual article display and price indicators XVII. As will be observed from Figs. 1 and 2, cover 10 rests on a base 19, to which is secured the entire mechanism of the machine. This base has adjustable legs 20 to assure correct support for the device.

Fig. 3 discloses the device interior, cover 10 being removed. Extending upward from base 19 is a framework 21, to which are mounted all parts of the device mechanism. At its upper end there is shown the article selector assembly VII, from which extend its depressible buttons 16. Assembly VII rests upon and is secured at 22 to the top ends of the frame sides. In front of the article selector and spaced at 23 from the frame sides is the price setting assembly VIII. These two instrumentalities cooperate with one another and constitute component parts of a novel combination. Immediately below the article selector and price setting assemblies combination there will be observed the delivery chute structure XIV, which directs both the main or principal articles handled by the device, in this instance packs of cigarettes, as well as secondary articles, that is books of matches, to its mouth 14′.

The main chute structure has two reinforcing side or end flanges 24 and 25, and between these side flanges is removably attached by screws 26 or by any other suitable means, a match holder XV, comprising a supporting channel 27, to which are attached and from which extend forwardly several individual magazines 28 for holding properly stacked books of matches 29. Main chute XIV is hinged to the framework along its left rear edge at 30 and may be swung forward, together with the match holder structure. At the right hand end of channel 27 there is provided a locking flange 31 which has two spaced perforations 32 for the reception of and registry with guide pins 33, extending from frontal flange 34 of channel-shaped frame portion 34′ for supporting the mechanism at the right end of the device. Pivotally secured at 35 to locking flange 31 is a manually operable detent 36, terminating in a hook formation 37, which is adapted to engage both flanges 31 and 34 and urge them against one another when chute structure XIV and match holder XV are to be locked in position. (Consult Figs. 3, 4 and 5.)

At the right hand side of Fig. 3 there is indicated at II the coin tester or coin selector mechanism, beneath of which is disposed a funnel 38 of coin tube 39 for the return of rejected coins or slugs. This tube enters coin control box 40, in which operate parts of the coin release mechanism V. Coin box 40 is connected by means of coin chute 41 to mouth 14′ of main chute XIV. Adjacent to tube 39 is located coin adding unit III, from which extends a bracket 42 supporting a solenoid 43. The latter forms a part of the coin return instrumentality VI, and becomes energized when handle 17 is operated. Beneath coin control box 40 is a coin receptacle 44 for coins received and accepted by the machine in exchange for articles dispensed therefrom.

By consulting the side or end elevation of the device mechanism, illustrated in Fig. 4, the relation of coin tester II to its coin tube 39 and to coin adding unit III and coin control box 40, will become readily apparent. It is to be noted that solenoid 43, while mounted to coin adding unit III, is both mechanically and electrically independent from the unit. The function of the solenoid will be explained presently. At the upper end of Fig. 4 there will be seen mounted above coin tester II the coin receiver I, which is intended to deliver coins into the coin tester. At the right of the coin receiver is indicated shaft 45, upon which is mounted a gear 46 in engagement with a gear segment 47. By consulting Fig. 37 it will be found that gear segment 47 is fixedly secured at one end of a sleeve 48, journaled upon a pin or shaft 49, which latter is fixedly secured to a reinforcement 49' of mechanism supporting channel 34'. The body of gear segment 47 has an extension 50 from which projects a pin 51.

Adjacent to the hub of gear segment 47, there is fixedly associated with sleeve 48 bearing 52 for a hub 53 of a bell crank 54 having an upwardly directed longer arm 55 and a downwardly directed shorter arm 56, see Fig. 4. From the free end of arm 55 extends a pin 57 which is adapted to be engaged by a depending extension 58 of coin return handle 17. At the outer or front end of sleeve 48 is fixedly secured thereto a lever 59 which operates together with the gear segment. A coil spring 59' wound about sleeve 48 engages lever 59 with one end and bears against lever 55 with its other end, thereby urging pin 57 of lever 55 against extension 58 of coin return handle 17.

Below the center of bell crank lever 55 there is operatively connected therewith at 60 a linkage 61 extending into the mechanism of the coin tester II. At the left hand web portion of gear segment 47 there is provided a pin 62 upon which is pivoted a connecting rod or link 63. The lower end of rod 63 operatively engages a pawl level 64 carrying pawl 65. The latter is adapted to engage a ratchet wheel 66 mounted on a shaft 67 of the match ejecting mechanism XVI, the construction and operation of which will be explained presently.

Referring back to lever 59 mounted on sleeve 48 with gear segment 47, from the end of this lever extends a pin 68 serving as pivot for a connecting bar 69, the lower end of which being journaled upon pin 70, projecting from crank 71. This crank is keyed to shaft 72, upon which latter is mounted a worm gear 73 in engagement with a worm 74. This worm is driven by a worm gear 75 actuated by a worm 76, which latter is mounted at the end of shaft 77 of motor 77'. The arrangement of the motor drive for crank 71 may be more clearly observed from Figs. 9a and 27.

Opposite pin 70 of crank 71 is an enlargement forming a cam 78, the function of which is to actuate double contact switch 79, as will be presently explained.

Referring to the exterior of the coin adding unit III, shown in detail in Figs. 22, 24 and 25, there extends from its outer wall a pin 80, upon which is mounted a substantially T-shaped lever 81, the left flattened arm 81' of which extends over solenoid 43, while its right hand arm 82 operates between two coacting limiting pins 83 and 83' projecting from the ends of two levers 84 and 84', which latter are pivoted, respectively, at 85 and 85'. A spring 86 engaging pins 83, 83' urges them towards each other, whereby arm 82 is yieldingly held centrally between the pins. The lower leg 87 of T-shaped lever 81 terminates in a fork structure 88, and operatively engages in its fork slot a pin 89, which controls the position of a coin directing vane 90, as will be presently explained in detail.

Below and to the right of pin 80 supporting T-shaped lever 81 is another pin 91 forming the pivot for an angular lever 92, the longer, upwardly curved end 93 of which extends into the operating path of pin 70 extending from crank 71, while at its shorter end 94 there is provided a pin 95 adapted to engage the right hand edge of lever arm 87, of T-shaped lever 81, and to move arm 87 to the left, the moment pin 70 engages upwardly curved end 93 of angular lever 92.

*Coin counter*

Again alluding to Fig. 4, the electro-mechanical coin counter IV is located at the extreme right middle portion of that figure and above the motor assembly XII. It is shown in detail in Figs. 28 and 29. There is illustrated a pin or shaft 96, extending from the coin counter mounting 96' secured to the web of support channel 34'. Upon shaft 96 is rotatably mounted a dielectric disc 97, a peripheral portion of which is provided with ratchet teeth 98, while to another part of the disc is attached a contact plate 99. The disc is normally urged by coil spring 100 to turn in anticlockwise direction.

Projecting through the disc body in the vicinity of plate 99, and extending beyond both faces of the disc, is a dielectric pin 101, the function of which will become readily evident. Mounted below disc 97 is a dielectric block 102. Its reduced portion 102' extends over the outer face of the disc. Block 102 serves as support for a plurality of contact springs 103, 104, 104' and 104", the free ends of which are designed to bear, respectively, against the upper ends of contact pins 105, 106, 106' and 106". These pins are slidably mounted in extension 102' and are adapted to bear against the outer surface of dielectric disc 97.

When contact plate 99, which rests within a recess of disc 97 and is flush with the outer surface thereof, becomes positioned below contact pin 105 and any one of the other pins 106, 106' and 106", electric circuits controlled by the pins and springs 103, 104, 104' and 104" are successively closed as plate 99 advances in anticlockwise direction.

The movement of disc 97 is controlled by an escapement pawl 107, which latter is pivoted on pin 108 and is operatively connected by means of another pin 109 to armature 110 of a solenoid 111. A spring 112 wound about pin 108 normally urges the armature-connected end of pawl 107 into engagement with teeth 98 of disc 97. Solenoid 111 is electrically connected with contact spring 103 and with other instrumentalities, as will be explained in connection with the electric diagram in Fig. 40. Each time solenoid 111 becomes energized or deenergized, armature 110 is successively drawn once upwards and then is depressed by spring 112, thus causing escapement pawl 107 to follow that movement and to once disengage and then reengage the teeth of disc 97, which latter is urged by spring 100 to move in anticlockwise direction. For each double movement of pawl 107, the disc moves the distance of one tooth length.

The end of pin 101 extending beyond the rear face of the disc is indicated at 101' in Fig. 29. This projecting portion of the pin is normally engaged by the lower end of slot 113 provided in connecting bar 114, see Fig. 28. The upper end 115 of the connecting bar is reduced in width and passes through two parallel horizontal portions 116 and 117 of a humped connecting link 118. Between these horizontal portions there is placed an expansion spring 119, through which passes reduced portion 115 of connecting bar 114. A cotter pin 120 limits the expansion of spring 119 and confines its position between the cotter pin and lower horizontal portion 116 of connecting link 118. Spring 119 has the tendency of urging connecting bar 114 in upward direction so that its shoulder 121 between its broader lower end and its reduced upper end 115 abuts with the lower face of link portion 116. The upper end of humped connecting link 118 is pivotally connected at 122 with shorter arm 56 of bell crank 54.

*Coin return*

Referring now to Figs. 4, 28 and 29, and alluding specifically again to pin 101 extending from disc 97, there extends into the path of operation of that pin two contact springs 123 and 124 of switch 125. This switch is electrically connected with and controls the operation of solenoid 43 mounted at the left of coin control box 42. As stated previously, solenoid 43 constitutes a portion of the coin return mechanism. When handle 17 of the coin return assembly is moved in downward direction, its extension 58, engaging pin 57 of lever 55, will cause bell crank 54 to move in anticlockwise direction, whereby its shorter lever 56 will move humped connecting link 118 upwards, thus causing the compression of expansion spring 119, whereby connecting bar 114 is drawn in upward direction. Since the slotted lower end of connecting bar 114 engages rear end 101' of pin 101 projecting through disc 97, the upward movement of bar 114 will cause the rotation of disc 97 in clockwise direction. Spring contacts 123 and 124 of switch 125 extending into the path of the movement of pin 101, this pin causes their abutment, whereby the electric circuit for energizing solenoid 43 becomes closed. The armature of solenoid 43 attracts flattened lever arm 81' of T-lever 81, and its longer arm 87 moves in anticlockwise direction or to the right, and causes the release of coins deposited in the machine.

*Coin adding unit III*

Referring to Figs. 4, 22 to 25, inclusive, the detail illustrations of the coin adding unit and of the coin control box disclosed in the latter four figures will facilitate the understanding of their construction, function and operation. As will be clearly seen from Fig. 25, the adding unit comprises a double frame 126 with an outer portion 127 and an inner portion 127', the latter being equipped with attaching lugs 128 for mounting the unit to the web of channel-shaped portion 34' of the device frame 21. Frame portions 126 and 127 of the adding unit are connected by spacers 129, and in their bodies there are provided coin channels 130 and 131, respectively. (See Figs. 22 and 24.) These channels are closed by removable covers 132 and 133. Coin channel 130 is intended for the reception of five cent coins, while channel 131 is adapted to receive ten cent coins.

Referring to Figs. 22, 24 and 25, there extend from the interior wall faces of the frame, bosses 134, 135 and 135', to which are secured supporting arms 136. Rotatably mounted between the free ends of these arms and the interior frame walls are pins 137 of dielectric cams 138, from which latter project into the two coin channels wire arms 139, their free ends 140 being bent at right angles to the channels and extending into the path of coins released into the channels. The interior of the channels are widened opposite to wire ends 140, indicated at 141, to facilitate a fairly unrestricted passage of the coins in downward direction as they momentarily engage these wire arms. Attached along one edge of frame 126 are three spring switches, of which switch 142 is intended for the nickel slot and switches 143 and 143' for the dime slot. These switches have resilient blades, of which the inner blades 144, 144' and 144" are shorter than the outer blades 145, 145' and 145". Both blades are of highly resilient material. There is provided for the longer blades a dielectric stop 146, while the shorter blades abut with the flat surface of cams 138.

Because of the resiliency of these blades and their mounting in respect to the cams, the latter are normally held in such a position that their respective wire arms 139 extend into the coin channels at right angles to the direction of travel of the coins. At this normal position of the cams the contact points of the switch blades are held in spaced position. When now a coin, such as indicated in broken lines at "D" in Fig. 24, or at "N" in Fig. 22, passes through the coin channels in downward direction, wire arms 139 are momentarily moved to their broken line position, shown in Fig. 24, and cams 138 are tilted. This momentary tilting of the cams causes the inner switch springs to move towards the outer springs, thus forcing together their contact points and closing electric circuits controlled by these switches. All of the switches 142, 143, and 143' are electrically connected with solenoid 111, operating escapement 107 of the previously described electric coin counter IV.

*Coin control box*

Reference is now had to the lower portion of Fig. 22 and to Fig. 23. In these figures the coin control box 40 is illustrated in detail, and comprises a hollow casing 147, provided with a removable front cover 148, a coin receiving funnel 149, and a coin chute 41 terminating in a coin discharge 150 directed into the article chute. The casing is opened at the bottom as indicated at 151 and has a top opening over chute 41 for accommodating coin tube 39, terminating at its upper end in a coin receiving funnel 38.

At the bottom of the coin control box is mounted an angular coin shed 152, having a longer inclined portion 153, terminating in chute 41, and a shorter inclined portion 154, directed toward coin receiver 44, see Fig. 4. The apex 152' of this coin shed is located beneath the center of funnel 149. Operatively mounted at 155, directly above shed apex 152', is the already-mentioned coin directing flap or vane 90, with its operating pin 89 extending through an arcuated slot 156, provided in cover 148, into fork 88 of depending leg 87 of T-lever 81. At the upper end of vane 90 there is secured an anti-friction roller 157. The vane and its roller 157 are adapted to normally support in horizontal position a coin rest 158, see Fig. 23, which latter is pivoted at 159 and is counterbalanced by a weight 160. The latter has a stop extension 161, permitting the weight to move upwardly, when coin rest 158 is depressed, but prevents the counterweight from moving downwardly.

Vane 90 is normally held by its pin 89 in upright position shown in Fig. 22, so that roller 157 will support coin rest 158.

When one or more coins, having passed through adding unit III, drop through funnel 149 upon coin rest 158, the latter will support them until it is freed by roller 157 to be tilted downwardly by the weight of the coins. Vane 90 and its roller 157 are swung out of the way of the coin rest by a clockwise movement of depending leg 87 of T-shaped lever 81. Such movement of leg 87 is effected by pin 95 of angular lever 92, when its upwardly curved end 93 becomes engaged by pin 70 of motor driven crank 71, see Fig. 4. Vane 90 is thus caused to swing to the left, and its roller 157 clears coin rest 158. The weight of the coins tilt the coin rest, whereby the coins are released and fall upon vane 90, and from there slide over shorter shed portion 154 into coin box 44.

When coins are to be returned, vane 90 must be tilted to the right by swinging leg 87 of T-shaped lever 81 in right hand or anticlockwise direction. Such movement of leg 87 takes place when flattened arm 81' of lever 81 is attracted by solenoid 43, when the latter becomes energized. The energizing of the solenoid has already been explained as being effected by the downward movement of handle 17 of the coin return mechanism. When thus vane 90 is swung to the right, coin rest 158 tilts and releases the coins against vane 90. The coins slide from the vane onto longer coin shed portion 153 and from there fall into coin chute 41, the lower end 150 delivering them into main chute mouth 14'.

Between removable front cover 148 of coin control box 40 and the latter's rear wall there is suspended on a pin 162 a coin break flap 163, the lower edge of which normally contacts the longer shed portion 153. This break flap is intended to not only slow down the movement of returned coins, but also prevents slugs or rejected coins passing through tube 39 into chute 41 from accidentally resting upon longer coin shed portion 153.

*Article selector*

Referring to Figs. 3, 4, 5, 7 and 16 to 21, inclusive, there is indicated at VII the article selector assembly, and at VIII the price setting assembly, which two instrumentalities not only cooperate with one another, but comprise a new combination. The article selector assembly constitutes an elongated structure, including a hollow, channel-shaped casing 164, as may be clearly observed from Figs. 16 to 21. Within this casing are operatively mounted the already mentioned depressible buttons 16, the detail construction of which is disclosed in Figs. 19 and 21. Each button is of a hollow construction and comprises a closed upper portion normally projecting through a suitable opening at the top of the casing, and a specially shaped lower portion operative within its hollow body. The top 165 of each button is preferably smooth, as are also its front and rear faces 166 and 166' and its sides 167. The apertures for the buttons provided in the top of casing 164 are designated at 168 (Fig. 19). The lower portion of the buttons operative within the channel cavity comprises a four-leg structure, with a pair of legs 169 at the front and a pair of rear legs 170, the legs of both pairs being of equal length. Relatively shallow recesses 171 uniformly space the legs of each pair, while the front pair of legs are separated from the rear pair of legs by deeper or higher recesses 172. At the front face 166 of each button there is provided a stop ledge 173, and from the rear face 166' extends a wedge-shaped structure 174. The upper surfaces of ledge 173 and of wedge 174 serve as stop means for limiting the upward movement of the button. From the interior of button top 165 there extends downwardly a central guide pin 175, shown clearly in Fig. 19. The lower end of the pin has a reduced extension 176 which is adapted, when the button is depressed, to extend through an opening 177 provided in the bottom closure 178 of channel 164. This closure also is provided with suitable recesses 178' serving as lower guides for the button legs.

Mounted about pin 175 is a spring element 179, resting against bottom closure 178, its function being to retain the button in its normal upward position. Between the rear channel flange 164', see Fig. 19, and rear button legs 170, there is supported by bottom closure 178, and guided between the latter, legs 170 and a plurality of projections 180, knocked out from channel flange 164', see Figs. 17 and 18, a row of normally abutting oblong, button-locking bars 181 and 181' of uniform length. Locking bars 181 may be considered interior bars, whereas locking bars 181' constitute the end bars of the arrangement. The top end edges of the abutting bar ends are rounded as indicated at 182. These roundnesses facilitate the entry therebetween of any of the button wedges 174 when one of the buttons is depressed.

From end locking bars 181' there extend pins 183, operative in suitable slots 184 provided in rear channel flange 164', see Figs. 17 and 18. These pins also project through slots 185 of two flat bar elements 186, see Figs. 16 and 17, which are movably mounted at the exterior of channel flange 164' and are guided by means of their inwardly bent, anchor-shaped outer ends 186' in slots 187 of channel flange 164'. The inner ends 188 of these bar elements are crimped forwardly and support one end of a coil spring 189, while the other end of spring is attached to a bracket 190, knocked out from channel flange 164'. The two bar elements 186 engage with their slots 185 pins 183 of end locking bars 181', whereby the latter are urged towards one another by springs 189 and thus cause interior locking bars 181 to normally abut with one another. The rounded abutting edges of all bars are located centrally below the wedges 174 of all buttons. Obviously the outer ends of both end bars 181' are normally positioned directly beneath the wedges of the end buttons.

*Operation of the article selector*

Referring to Fig. 18, the second button from the left is shown in depresed position, and its wedge formation 174 has spread apart in opposite directions end locking bar 181' and the next adjacent inner bar 181, as indicated by arrows. By spreading apart these two bars, all of the other bars are shifted so that their solid upper surfaces are moved beneath the wedges 174 of all other buttons, thus positively preventing their downward movement, while the second button is held in the depressed position indicated. The moment the pressure against this button is released, it automatically reverts to its normal, upward position, and all of the locking bars revert to their normal position, by the action of coil springs 189, at which position their rounded upper ends are again placed directly beneath the wedges of all now elevated buttons. It is to be noted that no provisions exist for locking the buttons in their depressed position, but on the contrary they are designed to immediately and automatically snap up to their normal, elevated position.

Price setting assembly

As has been stated previously, the article selector and the price setting assembly constitute a combination structure, wherein both instrumentalities cooperate with one another. Bottom closure 178, see Fig. 19, is provided with a lower flange 191 and a higher flange 192. Mounted on the lower flange are dielectric blocks 193, supporting three bus bars 194, 195 and 196. There is provided one block for each selector button. Secured also to blocks 193 are resilient switch blades 197, which extend from the blocks through side recesses 178', provided in both flanges of channel 164 and in its bottom closure 178, to beyond channel flange 164'. At the free end of these switch blades 197 are provided contact points 198, while approximately from the center of the blades there extend dielectric abutments 199. These abutments are adapted to be depressed by extensions 176 of pins 175 depending from the interior of button tops 165. Operatively mounted also on blocks 193, and urged into electro-conductive contact with switch blades 197 by coil springs 200, are bell crank or angular levers 201, one arm 202 of which serves as handle, while its other arm 202' constitutes a mobile contact member for engaging any one of the bus bars 194, 195 and 196, whereby resilient switch blades 197 are electrically connected with the chosen bars.

The higher flange 192 of channel closure 178 supports a continuous dielectric strip 203 upon which are mounted contacts 204, aligned with contacts 198 of resilient switch blades 197. From these contacts 204 extend wire attaching lugs 205.

Operation of price setting assembly

The bus bars 194, 195 and 196 of the price setting assembly are electrically connected with contact springs 104, 104' and 104'', respectively, of electric counter IV, while, upon setting of levers 201 in contact with the desired bus bars, resilient switch blades 197 become parts of individual circuits controlled by selector buttons 16. The electric circuits of each of the bus bars are controlled by the electric coin counter, and, depending upon its operation and setting, in response to the number of five cent units deposited in the machine, will bring one of the three bus bars into one of the three bus bar circuits. Each of the bus bars represents a certain money value. Thus, for example, bus bar 194 is intended for a ten cent value, bus bar 195 for a fifteen cent value, and bus bar 196 for a twenty cent value. Depending upon the position of arm 202' of lever 201 in respect to the three bus bars, the value desired for each of the selector buttons is determined. When arm 202' is placed upon bus bar 194, the value of ten cents must be deposited before merchandise will be dispensed when the device is operated by the depression of the corresponding selector button. Each downward movement of the button depresses switch blade 197 and brings contacts 198 and 204 to a closing position, whereby a solenoid circuit controlled by the depressed button becomes energized, and the mechanism operates to eject the desired merchandise.

Solenoid assembly

Referring to Figs. 5, 6, 7, 13 to 15 and 40, numeral IX in these figures designates an assembly of a series of solenoids 206, corresponding in number to the number of buttons of the article selector assembly. This solenoid assembly is arranged at the rear top of the machine within a channel-shaped support 207, see Figs. 5 and 7, and which support is provided with a closure 208, having at its front edge or flange 209 suitable spare-outs 210 for accommodating light bulbs 211, see Fig. 6. In Fig. 40 these solenoids, as well as their corresponding individual article selector buttons, and the terminal posts of terminal block "A," by means of which the switches controlled by these buttons are connected with their respective solenoids, are numbered correspondingly from 1 to 8.

Broadly speaking, the function of each individual solenoid is to release, when energized by the depression of its corresponding selector button, an individual article ejector, and to also cause the operation of a switch control bar, thereby actuating a main or starter switch. All of the above-mentioned instrumentalities will be more specifically described.

Ejector assembly

Referring to Figs. 5, 6, 7 and 10 to 15, inclusive, the article ejector assembly X comprises a reciprocating carriage structure supported by anti-friction rollers 212, mounted in suitable tracks 213, provided in the upper frame portion, and which rollers extend from two spaced and connected gear racks 214, forming the sides or ends of the carriage structure.

A specially constructed channel structure 215, mounted between these gear racks, connects and simultaneously spaces them. In the channel 215 there are provided both in its flanges and in its web or bottom suitable openings or spare-outs in which are operatively mounted individual article ejector units 216, each comprising an article ejector 216', swingable in one of the openings of the channel web, and an ejector detent 217, operative in the spare-outs of the channel flanges. Both of these instrumentalities are under spring tension, and, in their normal, inactive position, detent 217 engages ejector 216'. When released by the detent, the ejector is swung to its downward or operative position, shown in Figs. 12 and 14, by coil spring 218. Detent 217 is normally urged downwardly by its springs 219, and has an aperture 220 which normally engages reduced portion or lip 221 provided at the upper end of the rear arm of ejector 216'.

At the front end of the ejector there are mounted two spaced rollers 222, which, when the ejector is released by detent 217, are adapted to come to rest upon a specially designed web or frame top 223. This frame top extends between the two sides or ends of framework 21, and, as seen in Fig. 7, comprises a horizontal rear portion 224, an inclined middle portion 225, a raised horizontal portion or hump 226, and a slanting front portion 226'. In the web or frame top 223 are provided recesses 227, as seen in Fig. 5, in which ejectors 216' may operate when ejecting one of the cigarette packs from the cigarette magazines.

In the rear of carriage channel 215 there is pivotally mounted a switch actuating or control bar 228, as clearly seen in Figs. 10 to 15, and is adapted to be operable by any one of the ejector units. This bar is normally urged by a coil spring 229 to assume an upright position, as shown in Figs. 7, 13 and 15, and is maintained in that position as it rests against a pin 230 extending from the bottom of channel 215. Secured to and depending from bar 228 is a dielectric roller 231, which is intended to operate double contact switch blade 232 of the main or starter switch 233. (See Figs. 5, 10, 11, 13 and 14.)

This switch is mounted in a cut-out 234 provided in horizontal portion 224 of frame top 223, and is secured below the latter to a depending member 235. It is a double switch having two spaced rear and front stationary but resilient contact blades 236 and 237, between which operates the movable double contact blade 232. This latter blade, having two contact points, is normally urged by a coil spring 238 towards front contact blade 237.

While the ejector carriage is at its inoperative, starting rearward position, roller 231 of control bar 228 is adapted to press switch blade 232 against rear blade 236, as shown in Fig. 13, while bar 228 rests upright against post 230. When one of the individual article ejectors 216 is released and brought to the position shown in Fig. 14, its rear end will swing bar 228 away from pin 230, thereby elevating roller 231 so that it clears the upper end of switch blade 232 and releases the same to contact the forward stationary blades 237.

The individual ejectors 216', normally held in their inoperative position shown in Fig. 15, are released to their operative position when one of the selector buttons is depressed and closes the circuit energizing its corresponding solenoid 206. The moment that solenoid is energized, its core will attract detents 217, which in turn clears upper extension 221 of the rear end of the ejector, and spring 218 will cause the ejector to swing downwardly so that its rollers 222 come to rest on frame top 223.

The ejector carriage is operated by means of gear racks 214, which are in engagement with pinions 239, see Figs. 5, 7 and 15. These pinions are mounted upon shaft 45 which is journaled in bearings 240 and 240', and extends through bearing 240', as may be observed from Figs. 4 and 5. At the projecting end of the shaft is pinion 46 engaged by gear segment 47.

Operation of ejector assembly

As stated before, when one of the selector buttons is depressed, its corresponding solenoid 206 becomes energized, attracts its armature in the form of detent 217, which latter becomes elevated to clear extension 221 of individual ejector 216' and permits the latter to swing downwardly to the position shown in Fig. 14 so that its rollers 222 come to rest upon frame top 223. As ejector 216' assumes this swung-down position, its rear arm causes control bar 228 to swing away from its stop pin 230, whereby roller 231 is elevated and releases contact blade 232 of starter switch 233 to a circuit-closing position with front blade 237. As a result of closing the circuit controlled by contact blades 232 and 237, the motor of the device is energized and operates the actuating assembly, which in turn moves gear segment 47 first in anticlockwise and then in clockwise directions, whereby pinion 46 and shaft 45 are rotated first in clockwise and then in anticlockwise directions. These two motions are translated through gears 239 to gear racks 214, and move the ejector assembly first forwards and then rearwards to its starting position. As the ejector carriage advances, the released individual ejector element 216', now resting with its rollers 222 against the frame top, engages the topmost pack in the cigarette magazine and propels the latter into the delivery chute. During this forward movement, rollers 222 first pass over horizontal portion 224 of the frame top, and, as they reach and climb over inclined portion 225, the ejector becomes gradually elevated. When the rollers finally come to a momentary rest upon hump or raised portion 226 of the frame top, ejector 216' is brought to its normal, inoperative position and is locked in that position by detent 217, as the latter's aperture 220 engages reduced extension 221 of the ejector rear portion. Simultaneously, bar 228 is brought to its upright position, thereby causing dielectric roller 231 to project downwardly from channel 215. As the ejector assembly now moves in rearward direction to its starting position, roller 231 engages the upper end of switch blade 232 of the starter switch, breaks the contact between that blade and stationary blade 237, and presses blade 232 into contact with rear stationary blade 236.

Actuating assembly

In the course of describing the various instrumentalities of the device mechanism, the major portions of the actuating assembly were mentioned. Any of its parts not completely dealt with so far will be more closely identified by their respective functions in the general description of the operation of the device.

Motor assembly

Motor assembly XII has been already alluded to, and reference is now had to Figs. 4, 5, 9a, 26, 27 and 40. Motor 77' is mounted vertically in an opening 241 provided in channel-shaped portion 34' of framework 21, as clearly seen in Figs. 4 and 9a. Its worm and worm gear transmission is supported by a frame 242 attached to a bracket 243, which latter is secured to the framework, see Fig. 27. Bracket 243 also supports a double blade holding switch assembly 79, mounted on a bracket extension 244, and includes an actuating lever 245 for the switch blades. The lever is pivoted at 246, see Figs. 26 and 27.

Holding switch 79 comprises two cooperating pairs of resilient switch blades indicated at 247 and 247', and 248 and 248'. Actuating lever 245 has a hump 249 and a reduced upwardly turned extension 250, which latter is normally free, but is adapted to be engaged by cam 78 of crank 71, forming a part of the mechanism driven by the motor. Blades 247' and 248' are equipped with individual dielectric buttons 251, and are adapted to exert pressure against hump 249 of the lever by means of their buttons, thus forcing the lever against a dielectric stop 252, see Fig. 26. Lever 245 is normally retained in that position in readiness to being actuated by cam 78.

Connected with switch blade 247 by lead 253 is a resistance 254, mounted to bracket 243 by clamp 255. The other lead 256 of the resistor connects with the motor, as may be seen from the diagram in Fig. 40. Switch blade 247' is also connected to the motor by a lead 257.

Operation of motor assembly

The energization of the motor assembly and its function has been partly explained in connection with the description of other instrumentalities, however one of its important features is the operation of switch structure 79 by cam 78, as it relates to the function of the ejector assembly.

The motor is started upon depression of one of the selector buttons 16. Simultaneously one of the article ejectors is placed into operative position, causing the movable blade 232 of the starter switch to make contact with stationary blade 237, as the ejector carriage commences its forward travel, induced by the operation of the actuating assembly driven by the energized motor. The return of the ejector assembly to its original backward position must take place gently. As the carriage moves forward, the individually operated article ejector reverts to its normal, elevated position and permits bar 228 to assume its upright position, whereby switch operating roller 231 is turned to its downward position. In that position the roller will engage movable blade 232 of the starter switch and force it again into contact with fixed blade 236 on returning to initial position. During the interval when movable blade 232 is changing positions from contact 237 to contact 236, no current would be available to complete the homeward movement of the ejector carriage. For this purpose the operation of cam 78 is so timed that the cam engages reduced extension 250 of switch operating lever 245 and causes the latter to actuate double switch 79 before movable blade 232 of the starter switch disengages fixed blade 237. Thus blades 248 and 248' of switch 79 close the motor energizing circuit before the latter is opened by the movement of starter switch blade 232 away from fixed blade 237. Holding switch 79 remains closed while the ejector carriage approaches its rearward position, but is opened before blade 232 of the starter switch engages fixed contact blade 236, such engagement taking place when the carriage reaches its final rearward or starting position.

Simultaneously with the operation of switch blades 248 and 248', the other pair of switch blades 247 and 247' are also brought into contact engagement and place resistance 254 into the motor circuit, whereby the speed of the motor becomes materially reduced, which reduction in speed of the motor slows down the rearward movement of the ejector carriage.

Main article magazine

The magazine for holding the principal or main article to be dispensed from this device is designated generally at XIII, and comprises individual magazine units or holders 253, as disclosed in Figs. 3, 6 and 7, for accommodating stacks of cigarette packs P of different brands.

In each of the individual holders operates a cigarette pack support 259, which latter is the subject matter of the aforementioned co-pending application. This instrumentality consists of a self-contained spring motor 260, in the interior of which is a spiral spring 260', and which motor is provided at its periphery with gear teeth 261 and being removably and adjustably mounted in a bracket structure 262 depending from platform 263, the latter serving for supporting a stack of cigarette packs. Also depending from this platform is a rearwardly extending bracket extension 264, see Fig. 7, at the upper end of which is mounted a guide roller 265. Operatively suspended from the front portion of bracket 262 is a pawl 266, which is normally distanced from, but which is adapted to interlock with the teeth 261 of the spring motor when manually swung into engagement with the teeth. This pawl is held in its inoperative position by a suitable spring 267. Gear teeth 261 of the motor mesh with the teeth of a gear rack 268, constituting the front portion of upright 268', whereas guide roller 265 engages the smooth back of the gear rack upright. At the lower end of the rear bracket extension there is removably mounted another guide instrumentality 269, which latter, together with roller 265, maintain the correct engagement between the motor and the gear rack.

Particular attention is directed to the upper face of platform 263 of the cigarette supports 259, see Figs. 5, 7 and 11. It will be observed that extending upwardly from these platforms are abutments 263', which are adapted to project through the broadened rear portion of recesses 227 provided in the horizontal part 224 of frame top 223, when the last cigarette packs have been ejected from the magazines. At that instance the platforms are caused to engage the lower surface of rear horizontal portions 224 of the frame top.

Abutments 263' have for their purpose to extend into the path of operation, that is the downward swing, of the individual article ejector unit 216. When now any one of the cigarette magazines is empty, and its respective selector button is depressed, the corresponding solenoid becomes energized. Normally, that action would release ejector unit 216, and thereby operate control bar 228 which in turn would cause the release by roller 231 of movable starter switch blade 232 to its engaging position with fixed blade 237, whereby the actuating assembly would become energized and would commence the operation of the ejector assembly. Since, however, ejector unit 216 is prevented by the platform abutment 263' to operate, the ejector assembly remains in its rearward position.

Operation

The self-propelled cigarette pack support or carrier 259 is intended to urge the cigarette packs in upward direction against the flat portion 224 of frame top 223. Since this top portion is provided with spare-outs 227, only the edges of the uppermost cigarette packs will rest against the metal, whereby the friction between the packs and the frame top is considerably minimized.

When the individual magazine units are to be stacked, carrier 259 is depressed to its downwardmost position, and pawl 266 is moved into engagement with motor teeth 261. While the carriage travels downwardly, spring 260' of the motor is wound up and is brought under increasing tension. While the carriage is held in its depressed position by pawl 266, packs of cigarettes are now placed through the tops of the magazine upon platform 263, until the magazine is filled, whereupon pawl 266 is released. The cigarette packs resting upon the platform are constantly urged in upward direction and against frame top 223 by the action of the motor spring. As one article after another becomes discharged, the motor successively elevates carrier 259, and the tension of its spring decreases in the same proportion as the articles are removed from the magazine.

Delivery chute

Referring to Figs. 3, 4 and 7, and particularly to the latter figure, the delivery chute, generally designated by XIV in Figs. 3 and 4, is a self-contained unit, which, as stated previously, is hinged at 30 at the left portion of framework 21. (See Fig. 3.) Its structure comprises a rear wall 270, with an upper edge 271 located below the bottom faces of the uppermost cigarette packs held in the several magazine units. From edge 271 depends a deflector plate 272.

The frontal portion of the main chute structure extends in height above rear wall 270 and has an inwardly curved upper end 273, which abuts with the frontal flange 274 of frame top 223. Continuing from curved upper end 273 is a vertical wall portion 275 from which extends downwardly a rearwardly inclined deflecting surface 276, which guides the cigarette packs into a chute passage 277, through which the packs are directed into mouth 14' of the chute. The rear part of mouth 14' is curved at 278 for the purpose of correctly delivering the cigarettes at the bottom of mouth 14' in longitudinal position to facilitate their removal. Above the horizontal portion of mouth 14' there is disposed an inwardly directed extension 278' terminating in a cylindrical formation 278'', as clearly seen in dotted lines in Fig. 4 and in full lines in Figs. 7, 8 and 9a. This extension is primarily designed to facilitate the ejection and correct delivery of matches, as will be presently described.

Operation

As a pack of cigarettes is ejected from its magazine, it first passes over top edge 271 of inner wall 270, and falls against deflector plate 272. From there it is forced into contact with frontal wall portion 275 and is turned against deflecting wall portion 276, which directs it through chute passage 277 into mouth 14'.

Match holder

Referring to Figs. 3, 4, 5 and 7 to 9a, the match holder designated XV has been already partially described as to consist of a plurality of individual magazines 28 attached to supporting channel 27, and in which magazines are placed stacks of book matches 29. These individual magazines comprise vertical channel structures with closed backs or rear walls 279 and open both on top and bottom, as well as in the front at 279' between its vertical side flanges 280, as seen in Fig. 9. At the bottom end there are provided inwardly directed, spaced flanges 281, for the support of matches. It will be noted from Figs. 8 and 9a that the lower end of the rear wall 279 of each magazine terminates at 282 substantially above match supporting flanges 281.

The books of matches are stacked so that the thicker end of one book of matches rests on top of the thin end of the book of matches below.

Match ejector

Again referring to the aforestated figures, match ejector XVI constitutes a simple mechanism by means of which a book of matches is delivered at the same time a pack of cigarettes is dispensed from the device.

One of the principal advantages of this match ejector and the match holder resides in the fact that even though one of the match holding magazines may be empty, the likelihood exists that a match may be delivered from any of the other match magazines which still holds matches. Thus unless all the matches in all magazines are exhausted, the device may supply a book of matches with each purchase of cigarettes.

The principal portion of the ejector mechanism is supported by brackets 283 attached to and extending rearwardly from supporting channel 27. In these brackets is rotatably lodged an operating shaft 67, at one end of which is fixedly mounted the previously mentioned ratchet wheel 66, adapted to be engaged by actuating pawl 65 of pawl lever 64, which latter is connected by means of connecting rod 63 to gear segment 47. (See Fig. 9a.)

In the device illustrated, the match holder consists of five magazines. Obviously, any desired number of match magazines may be provided. Since in the present device five match magazines are employed, ratchet wheel 66 has a corresponding number of five ratchet teeth. Upon shaft 67 are mounted five actuating cranks 284 having actuating pins 285, placed, successively, at each fifth of a circle, their position corresponding to the position of the ratchet wheel teeth.

As will be observed from Figs. 8 and 9, match magazines 28 are attached to supporting channel 27 in spaced relation to one another. At the side walls of the magazines there are pivotally secured at 286 two ejector bell levers 287 and 287', their upper portions forming semi-yokes, which are united in the rear of each magazine, as clearly seen from Fig. 9. The yoke arms of levers 287' terminate in short ends 287'', while the corresponding yoke ends of levers 287 form cam extensions 288, designed to be engaged by pins 285.

Between the lowermost ends of the depending longer arms of levers 287 and 287' are secured match ejector means 289, consisting of connecting bars 290 and match engaging elements 291, which latter are provided with a rounded downwardly bent lip portion 292, as clearly seen in Figs. 4 and 7. While connecting bars 290 extend from levers 287 to levers 287', the width of match-engaging elements 291 is such as to permit their unrestricted passage between match supporting flanges 281 at the bottom of the magazines. Thus these elements may move freely from the front of the match holders towards their rear.

From the yoke end connecting portions of levers 287 and 287' in the rear of each of the magazines there extend pins 293, to which are secured the lower ends of tension springs 294, their upper ends being suspended from the upper flange of channel 27. These springs are designed to normally urge the longer depending arms of the ejector levers 287 and 287' inwardly, that is towards the rear of the match magazines.

Operation

Referring now to Fig. 9a, there is diagrammatically illustrated both the match ejector assembly XVI, as well as the motor assembly XII. When the motor becomes energized, it revolves worm gear shaft 72 and cam crank 71 a full revolution. By means of pin 70, extending from crank 71, the revolution of the latter actuates connecting rod 69 and translates its motion by pin 68 to lever 59 and gear segment 47, both mounted on sleeve 48 supported by pin 49. The swinging motion of gear segment 47 is translated by means of pin 62 to connecting rod 63, which in turn operates pawl lever 64. Its pawl 65, engaging one of the teeth of ratchet wheel 66, moves this ratchet wheel one-fifth of a revolution, and thereby also turns ratchet wheel shaft 67 through the same arc. One of the five actuating cranks 284 is thus also swung through a fifth of a circle, and its pin 285 depresses its corresponding cam end 288 of one of the ejector lever pairs 287 and 287', and moves their match ejector means 289 to the front of their magazine.

During the next operation of ratchet wheel 66, the actuating crank pin, which depressed cam end 288, is turned another one-fifth of a revolution and frees the cam end, thus permitting spring 294 to snap lever combination 287 and 287', with its ejector means 289 to their rearward position. This forceful rearward movement of the match ejector means brings the latter into engagement with and causes the ejection of the lowermost book of matches into chute XIV. The cylindrical end formation 278" of inward extension 278' within the chute facilitates the placement of the ejected book of matches into accessible position at chute mouth 14'.

*Article display and price indicator assembly*

Reference is had to Figs. 30 to 36, inclusive. In Fig. 30 there is shown cover 13 of cabinet 10 provided with a number of apertures for accommodating certain parts of the mechanism which must be accessible. Thus there is shown at the right an opening 295 for the coin receiver "I." In the front are openings 296 for selector buttons 16, and at the right and rear there is an opening 297 for facilitating the operation of coin return handle 17 of the coin name plate 18.

In back of the row of the selector buttons there is provided a large, elongated framed window opening 298, in which is held a transparent panel 299. The latter covers and renders visible a combination article display panel and price indicator XVII. This device is mounted above the ejector structure for cigarettes and is illuminated from beneath by the already mentioned electric bulbs 211. The device comprises a metal frame 300, bent to produce lower and upper steps 301 and 302. In the lower step 301 there is arranged a row of individual sub-frames 303 which are preferably bowed upwardly, and beneath these sub-frames the body of the lower step portion 301 is removed, as indicated at 304 in Fig. 32. Held in place by sub-frames 303 are pictorial representations 305 of the different brands of cigarettes contained in the several cigarette holder units. Each of such representations is covered by a transparent sheet 306.

In the higher front step portion 302 there are provided small windows 307. In line with each of these windows are pins or rivets 308, supporting rotary discs 309, which are made of opaque material, but which material is treated to produce translucent indices or numerals, as seen in Fig. 36 at 310. Due to this translucency of the indices they also become visible through transparent panel 299. Since discs 309 are rotatably mounted on pins 308, they may be set to expose any one of its numbers through small windows 307. Obviously the setting of these discs facilitates the indication of various prices of the cigarettes handled by the machine.

The article display and price indicator assembly is bodily removable when cover 13 is swung open, thus provding free access to the upper portion of the mechanism.

*Coin receiver*

Although the coin receiver "I" may be considered a part of coin tester II, it deserves special notice. It has been found advantageous to slow down the movement of the coins inserted before they reach coin tester II. For this purpose the coin receiver body is of substantially an inverted "S" construction, as is clearly perceivable from the illustration in Fig. 4.

*Cabinet*

One of the notable features in the present device is the construction of the cabinet, reference is being had to Figs. 1, 2, 5 and 30 and 31. As has been mentioned previously, the cabinet comprises a hinged front 11, an openable side end 12 and an openable top 13. The front consists of not only the actual front part of the cabinet, but includes the frontal half of the left side thereof, while the rear half of the left side forms a continuation of back 10'. Right side 12 of the cabinet is swingable rearwardly and is adapted to interlock along its vertical front edge 311 with the front 11, see Figs. 2 and 5. The same type of interlocking engagement takes place between the top edge of front portion 11 and the bottom edge of cover 13, as clearly illustrated in Fig. 31. The upper edge of front portion 11 is bent inwardly at 312, while the bottom edge of cover 13 is formed into a channel 313 adapted to receive the inwardly bent edge 312 of the front portion. As will be also observed from both Figs. 30 and 31, that cover 13 is hinged at 13' by its rear portion 314, along the upper edge of cabinet back 10'.

The cabinet is brought to its fully closed position by first closing the cover 13, whereupon front 11 is brought to its closing position, so that its flange 312 engages cover channel 313, and finally side 12 is swung closed and interengages front 11 along its right hand edge at 311, see Fig. 5. Side portion 12 constitutes the door for the cabinet and is preferably lockable.

Attention is invited to Figs. 1 and 2, and especially to legs 20 extending from base 19. These legs are preferably adjustable to facilitate leveling of the device in order to assure its correct operation.

*Electrification*

Referring to Figs. 38, 39 and 40, there is disclosed in the first two figures an assembly of devices mounted in back 10' of the cabinet cover, by means of which the machine may be connected to an existing electric outlet for supplying the required operating current, and whereby the supply of current is controlled.

Back wall 10' has an aperture 315, at the periphery of which there is secured a box or well 316. At the bottom of the well there are fixedly held a dielectric connector 317, a toggle switch 318 and a fuse mounting 319, which latter has a removable cover 320 providing access to the interior of the mounting for the replacement of fuse cartridges.

As will be observed from Fig. 39, all the three instrumentalities disposed within the well are accessible from without the cabinet. Thus a plug 321 may be readily secured to connector 317, switch 318 may be operated and a fuse may be changed in mounting 319.

*General description and operation of the mechanism*

Referring to Fig. 40, there is disclosed the wiring diagram of the device in which all indicated numerals correspond to the numerals provided in the previously described figures. For the purpose of facilitating the explanation of this diagram, the arrangement and the functions of the several instrumentalities constituting the mechanism of the device will be followed from the point of inserting coins into the machine, reference being had to the detail illustrations in other figures.

*The wiring*

Commencing with terminals 322 and 322' of dielectric plug receptacle 317, it will be seen that from terminals 322 connection is made through switch 318 and the fuse in receptacle 319, from which issues conduit 323 attached to the right hand post of terminal 8 in terminal block "C." Terminal 322' of the plug receptacle is connected by lead 324 to the right hand post 7 of the terminal block. From left post 8 extends lead 323" to terminal 323" of motor 77' of motor assembly XII. From the left post of terminal 7 lead 324' passes to light bulbs 211 mounted below the article display and price indicator assembly XVII, shown in Fig. 33. From bulbs 211 lead 324" terminates in the left terminal post 9 in terminal blocks "C," and from the right post continues lead 325 to terminal 4 of terminal block "B" and from there to switch blade 123 of coin return switch 125. The other blade 124 of this switch is connected by conductor 325', to terminal post "1" of terminal block "C." From terminal 4 of terminal block "B" a lead 326 connects with contact spring 103 of electric coin counter IV. Another lead 326' extends from post 4 of block "B" to solenoid 111 of electric counter IV, and from the solenoid extends lead 326" to terminal post 2 of terminal block "C." From the left screw of post "1" of terminal block "C" there extends conduit 325" to solenoid 43 of the coin return, and from there to operable switch blade 144" of lower dime controlled switch 143' of the coin adding unit III. Blade 144" is electrically connected with operable blades 144' and 144 of the upper dime controlled switch 143, and of nickel controlled switch 142, respectively. From these interconnected operable switch blades there extends lead 327 to the left screw of terminal 4 in block "C."

Referring again to the switches in adding unit III, their stationary blades 145, 145' and 145" are interconnected with one another. Conductor 328 connects these blades with the left screw of terminal 2 in block "C." Bridging terminals 2 and 4 of block "C" is a condenser 329 for suppressing electric spark emission from the switches of the adding unit.

Referring to motor assembly XII, motor 77' is provided with four terminals, one of the terminals 323" has already been mentioned as being connected by leads 323' and 323 through fuse mounting 319 to terminal 322 of receptacle 317. The other terminals of motor 77' are indicated at 330, 331 and 332. From terminal 330 extends a conduit 256 to one end of resistor 254, and from its other end the lead 253 passes to stationary blade 247 of double holding switch 79. From the opposite, operative switch blade 247' lead 257 connects with terminal 331 of the motor. Terminals 330 and 331 represent tops in the motor winding, and when switch blades 247 and 247' close the circuit of resistance 254, this resistance is placed in series with the motor winding and causes the slowing down of the motor.

The other pair of double switch 79, indicated by numerals 248 and 248', are electrically connected as follows: From stationary blade 248 extends a lead 333 to the left screw of terminal 3 in terminal block "C." Another lead 333' connects stationary blade 248 with motor terminal 332. From the right hand screw of terminal 3 in terminal block "C" lead 333" extends to stationary blade 233 of the starter switch 233. Operable blade 248' of the double switch 79 is connected by lead 334 to the left post 6 of terminal block C. From the right hand screw of post 6 extends conduit 334' to movable blade 232 of starter switch 233.

Referring now to the rear stationary blade 236 of the starter switch, that blade is connected by conduit 335, through combination thermo-switch and condenser 335', to the right hand screw of terminal 5 in terminal block "C." From the left hand screw of that terminal lead 325" extends to one end of the windings of all solenoids 206, numbered 1 to 8, in the solenoid assembly IX. The other ends of the solenoid windings are individually connected by leads 336, 337, 338, 339, 340, 341, 342 and 343 to the respective right hand screws of terminals 1 to 8 in terminal block "A." The left hand screws of these terminals are connected by conductors 336' to 343', to the several lugs 205 of fixed switch contacts 204 located beneath depressible switch blades 197, extending from price setting assembly VIII. Blades 197 are controlled by buttons 16, also numbered 1 to 8, in the same manner as the terminal posts of terminal block "A" and the solenoids of the solenoid assembly.

The three bus bars 194, 195 and 196 of price setting assembly VIII are connected, respectively, by conduits 344, 345 and 346 to terminal posts 3, 2 and 1 of terminal block "B," and from which posts extend, respectively, leads 344', 345' and 346' to contact springs 104, 104' and 104" of electric coin counter IV. It will be noted that in terminal block "C" the terminals 4 and 5, terminals 6 and 7 and terminals 8 and 9 are respectively connected with one another.

*General operation*

Before the device is to be operated it is necessary that the values of the different articles to be dispensed be first determined, and accordingly the several price control levers 201 of price setting assembly VIII must be set to the desired position in contact with the three bus bars 194, 195 and 196.

When the device is electrically connected, light bulbs 211, supplied independently with current by leads 324' and 324", will illuminate the article display and price indicator assembly XVII of Fig. 33.

At the starting position of ejector assembly X, as shown in Fig. 40, movable blade 232 of starter switch 233 contacts with right hand stationary spring 236. Mobile contact spring 232 is held in that position by dielectric roller 231 depending from control bar 228.

The device is now ready to operate upon the depression of one of the buttons of its selector assembly VII.

The required number of coins are inserted in coin receiver "I" and pass through coin tester II, see Fig. 4. From there they enter the coin adding unit III, see Figs. 22 to 25, inclusive. As the coins fall through the adding unit they momentarily close switches 142, 143 and 143', depending upon the amount and the denomination deposited.

Assuming now that an article costing fifteen cents is desired. The equivalent of three five-cent units have to be deposited in the machine. This required amount may be placed therein in the form of either three nickels or one nickel and one dime. In either case the adding unit will produce three individual electrical impulses as the coins operate the respective switches. As indicated by the positions of levers 201 of price setting assembly VIII, the merchandise costing fifteen cents may be obtained by depressing any one of the buttons 2, 4, 5, 6, 7 and 8 of the article selector VII. Assuming now that an article controlled by button 8 is desired, and that one nickel and one dime are employed, the nickel will close switch 142 of the adding unit, thereby energizing solenoid 111 of the coin counter. In response to this electric impulse the solenoid will operate escapement 107, and disc 97 will move one tooth in anticlockwise direction, which movement is induced by coil spring 100 mounted on pin 96 supporting disc 97, see Fig. 29.

As the dime is inserted, switches 143 and 143' will be successively closed and will energize solenoid 111 twice, thereby causing disc 97 to advance two more teeth in anticlockwise direction. By this successive movement of the disc, its contact plate 99 is brought into engagement with the three contact pins 105, 106 and 106', see Fig. 28, held under tension by springs 103, 104 and 104', respectively. By thus electrically connecting these three blades, bars 194 and 195 are placed into the electric circuit controlled by switch blade 197 under push button 8 of the selector assembly. The moment that button is depressed the circuit of solenoid 8 is closed, and as solenoid 8 thus becomes energized it will attract detent 217 and elevate it out of engagement with reduced end 221 of the rearward portion of ejector 216, which latter is now brought to its downward, operative position. At the same time operative bar 228 swings forward and elevates its roller 231, which latter releases mobile switch blade 232 of the starter switch and permits it to make contact with forward stationary blade 237. The closing of the circuit controlled by switch blades 232 and 237 energizes motor 77'. The motor now commences to move the actuating assembly XI, see Figs. 4 and 9a, whereby the ejector carriage is set into motion and ejects the desired article opposite button 8.

During the forward movement of ejector assembly X, the formerly released article ejector 216 is brought back to its normal, inoperative position, shown in Fig. 40, and bar 228 reverts to its upright position, thus causing roller 231 to assume its downward position so that it may engage mobile spring 232 of the starter switch as the ejector assembly moves to its starting position.

Just before roller 231 engages mobile switch blade 232, revolving cam 78 of cam crank 71 engages lever 245 of double holding switch 79 and closes the latter. The closing of this switch serves two purposes. First it bridges the motor energizing circuit, which at that moment is still held closed by starter switch blades 232 and 237. These blades are caused to separate during the backward movement of the ejector assembly X. The second function of switch 79 is to place resistance 254 in series with the motor winding and to slow down the operation of the motor. Thus the backward movement of the ejector carriage continues at a reduced speed, mobile blade 232 disengages fixed blade 237 of the starter switch, and the carriage reverts to its final backward or starting position.

As the ejector carriage moves to that position, cam 78 releases lever 245 and opens holding switch 79. As the carriage assumes its starting position, mobile switch blade 232 of the starter switch re-engages stationary switch blade 236 and prepares the device for the next operation.

The coins having passed through the adding unit and having caused the necessary electric impulses to bring the bars of the price setting assembly into the circuit controlled by one of the buttons of the selector assembly, fall into funnel 149 and against balanced coin rest 158, and are released into coin receiving box 44, in the manner already described, by pin 70 of cam crank 71, as that pin engages curved arm 93 of lever 92.

Referring to the left hand lower portion of Fig. 40, solenoid 43 is energized when coins deposited into the machine are to be returned. This solenoid, being electrically connected with switch 125 of the coin counting assembly, is closed when the handle of the coin release is moved downwardly, as has been explained previously.

Referring to the end part of the description under the heading "main article magazine," there was explained the function of abutment 263' extending from platforms 263 of the individual cigarette pack supports 259. It was also stated that when a magazine is empty, and its corresponding selector button is depressed, its respective solenoids 206 become energized, although the ejector assembly will not operate. While under these conditions a selector button is retained in its depressed position, current continues to pass through its corresponding solenoid. It is essential, therefore, that means are provided for preventing burning out the solenoid in the event the pressure against the button unduly continues. The already mentioned combination thermo-switch and condenser assembly 335', seen at the right hand lower end of Fig. 40, serves the required purpose. When current continues to pass through any one of the solenoids, the resistance of the thermo-switch will become heated, thereby causing the opening of the switch, thus breaking the circuit controlled by the starter switch 233, which is normally closed, by movable blade 232 contacting rear stationary blade 236. The moment the depressed selector button is released, current ceases to flow through the resistance, the resistance cools and permits the switch to automatically close, thus preparing the device for its next normal operation.

Referring to Figs. 4, 9a and 37, it has been stated that gear segment 47 has a downward extension 50 provided with an extending pin 51. When gear segment 47 moves in anti-clockwise direction pin 51 is adapted to engage arm 56 of coin release lever 54, thereby actuating, through connecting members 118 and 114, see Fig. 28, dielectric disc 97 of the coin counter in clockwise direction. Such momentary movement of disc 97 assures the proper engagement of the escape lever 107 with teeth 98 of the disc.

*Resume*

While the drawings described in the foregoing disclosure illustrate specific structures of the different instrumentalities comprising the operating mechanism of the present device, it is very obvious that changes and improvements, not only in each of these instrumentalities, but also in the general arrangement of the device, may be required in order to adapt the machine for vending articles different from those mentioned herein, and it is to be understood that such changes and improvements are to be considered to fall within the broad scope of this invention, without departing from the intent thereof, as defined in the annexed claims. What is claimed as new is:

1. In a vending machine, the combination with a cabinet having a movable front, of a mechanism in the cabinet and including rear and front magazines for different articles and ejecting means for both, and a common chute between said magazines for the reception of ejected articles, said front having a framed aperture cooperating with said chute when the front is closed.

2. In a vending machine as in claim 1, said front magazine being operatively connected with and being movable relative to said rear magazine when said front of the cabinet is open.

3. In a vending machine as in claim 1, said front magazine and said chute being fixedly associated with one another and being operatively connected with and movable relative to said rear magazine when said cabinet front is open.

4. In a vending machine as in claim 1, said rear magazine being fixedly held within the cabinet, said front magazine and said chute being fixedly united with each other and being hingedly associated with said rear magazine and being swingable towards or away from said rear magazine while said cabinet front is open.

5. In a vending machine as in claim 1, said rear magazine being fixedly held within the cabinet, said front magazine and said chute being fixedly united with each other and being hingedly associated with said rear magazine and being swingable towards or away from said rear magazine while said cabinet front is open, said chute having a mouth extending beneath said front magazine, said framed aperture of the cabinet front being adapted to register with said chute mouth when the cabinet front is closed.

6. In a vending machine, the combination with a cabinet having a front hinged along one of its sides, of a vending mechanism fully housed within the cabinet when the front is closed, said mechanism including rear and front article magazines, ejecting means for articles of both magazines and an article chute disposed between said magazines and having a delivery mouth for receiving ejected articles, said rear magazine being fixedly mounted within the cabinet, said front magazine and said chute being fixedly associated with one another and being hingedly connected with said rear magazine so that they may be swung together away from the rear magazine when the cabinet front is open, the latter having a framed aperture adapted to serve as an extension of said chute mouth when the cabinet front is closed.

7. In a vending machine as in claim 6, said chute having a relatively wide upper portion with deflector means for articles ejected from the rear magazine and a relatively narrow passage directed into said delivery mouth for delivering ejected articles from the rear magazine in forward direction, said chute having other means in cooperation with the front article magazine for directing articles ejected from the latter in rearward direction into the chute mouth.

MARIO CARUSO.

REFERENCES CITED

The following references are of record in the file of this patent:

UNITED STATES PATENTS

| Number | Name | Date |
|---|---|---|
| 1,747,387 | Paulson | Feb. 18, 1930 |
| 1,754,527 | Rowe | Apr. 15, 1930 |
| 1,782,768 | Rowse | Nov. 25, 1930 |
| 1,849,145 | Illig et al. | Mar. 15, 1932 |
| 1,891,640 | Gottfried | Dec. 20, 1932 |
| 1,911,207 | Robinson | May 30, 1933 |
| 1,926,848 | Giles | Sept. 12, 1933 |
| 1,997,078 | Reimers et al. | Apr. 9, 1935 |
| 2,045,409 | Redmond et al. | June 23, 1936 |
| 2,076,564 | Hoban | Apr. 13, 1937 |
| 2,103,367 | Hoban | Dec. 28, 1937 |
| 2,254,841 | Gabrielsen | Sept. 2, 1941 |
| 2,279,936 | Brodie et al. | Apr. 14, 1942 |
| 2,311,751 | Hoyt | Feb. 23, 1943 |
| 2,323,981 | Du Grenier | July 13, 1943 |
| 2,333,176 | Hoban | Nov. 2, 1943 |
| 2,360,573 | Mena | Oct. 17, 1944 |
| 2,377,413 | Fry | June 5, 1945 |
| 2,390,535 | Higham | Dec. 11, 1945 |

FOREIGN PATENTS

| Number | Country | Date |
|---|---|---|
| 354,418 | Great Britain | Aug. 13, 1931 |
| 137,399 | Austria | Apr. 25, 1934 |